United States Patent
Lee et al.

(10) Patent No.: US 11,036,425 B2
(45) Date of Patent: Jun. 15, 2021

(54) STORAGE DEVICES, DATA STORAGE SYSTEMS AND METHODS OF OPERATING STORAGE DEVICES

(71) Applicant: SAMSUNG ELECTRONICS CO., LTD., Suwon-si (KR)

(72) Inventors: Su-Ryun Lee, Suwon-si (KR); Bum-Hee Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 16/506,793

(22) Filed: Jul. 9, 2019

(65) Prior Publication Data
US 2020/0142630 A1    May 7, 2020

(30) Foreign Application Priority Data
Nov. 1, 2018   (KR) .......................... 10-2018-0132843

(51) Int. Cl.
*G06F 12/02* (2006.01)
*G06F 12/10* (2016.01)
*G06F 3/06* (2006.01)
*G06F 9/4401* (2018.01)
*G06F 12/1009* (2016.01)

(52) U.S. Cl.
CPC .......... *G06F 3/0656* (2013.01); *G06F 3/0659* (2013.01); *G06F 3/0679* (2013.01); *G06F 9/4401* (2013.01); *G06F 12/0246* (2013.01); *G06F 12/1009* (2013.01); *G06F 3/0607* (2013.01)

(58) Field of Classification Search
None
See application file for complete search history.

(56) References Cited

U.S. PATENT DOCUMENTS 6,377,500 B1 *  4/2002  Fujimoto ............ G06F 12/0246
                                                    365/230.01
7,734,891 B2 *  6/2010  Wong .................. G06F 12/1009
                                                    711/206
(Continued)

FOREIGN PATENT DOCUMENTS

KR      20180054394 A      5/2018

OTHER PUBLICATIONS

EPO Search Report dated March 10, 2020 Cited in Corresponding European Patent Application No. 19193480.1.

*Primary Examiner* — Kaushikkumar M Patel
(74) *Attorney, Agent, or Firm* — Volentine, Whitt & Francos, PLLC

(57) ABSTRACT

A storage device includes a main storage and a storage controller to control the main storage. The main storage stores data and includes a plurality of nonvolatile memory devices. The storage controller loads at least one of (a) at least a portion of mapping tables and (b) at least one of a portion of directories to a host memory buffer included in an external host device, based on at least one of a size of the host memory buffer and locality information associated with a data access pattern of the host device. The mapping tables are stored in the nonvolatile memory devices and the mapping tables indicate a mapping relationship between a physical address and a logical address of corresponding ones of the nonvolatile memory devices. The directories store address information of the mapping tables.

20 Claims, 23 Drawing Sheets

(56) References Cited

U.S. PATENT DOCUMENTS

| | | | |
|---|---|---|---|
| 9,563,382 B2 | 2/2017 | Hahn et al. | |
| 9,720,605 B2 * | 8/2017 | Lin | G06F 3/0688 |
| 10,007,433 B2 | 6/2018 | Hahn | |
| 10,055,164 B2 | 8/2018 | Benisty et al. | |
| 10,108,371 B2 | 10/2018 | Nimmagadda et al. | |
| 2013/0326121 A1* | 12/2013 | Cheng | G06F 3/0679 |
| | | | 711/103 |
| 2014/0181402 A1* | 6/2014 | White | G06F 12/0897 |
| | | | 711/122 |
| 2015/0324284 A1 | 11/2015 | Kim et al. | |
| 2015/0356020 A1* | 12/2015 | Desai | G06F 12/123 |
| | | | 711/103 |
| 2017/0235681 A1* | 8/2017 | Kaburaki | G06F 12/0292 |
| | | | 711/128 |
| 2017/0285940 A1 | 10/2017 | Benisty et al. | |
| 2017/0293562 A1 | 10/2017 | Zaretsky et al. | |
| 2017/0300422 A1* | 10/2017 | Szubbocsev | G06F 12/10 |
| 2017/0351452 A1 | 12/2017 | Boyd et al. | |
| 2018/0039578 A1 | 2/2018 | Yun et al. | |
| 2018/0136875 A1 | 5/2018 | Nimmagadda et al. | |

* cited by examiner

133

STORAGE DEVICES, DATA STORAGE SYSTEMS AND METHODS OF OPERATING STORAGE DEVICES

CROSS-REFERENCE TO RELATED APPLICATION

A claim for priority under 35 USC § 119 is made to Korean Patent Application No. 10-2018-0132843, filed on Nov. 1, 2018, in the Korean Intellectual Property Office (KIPO), the entire contents of which are hereby incorporated by reference.

BACKGROUND

The present inventive concepts relate generally to data processing, and more particularly to a storage device, a storage system including the same and a methods of operating a storage device.

A host typically uses a data storage device including nonvolatile memory such as flash memory. A flash translation layer (FTL) is utilized with flash memory to map logical addresses generated by the host and corresponding physical addresses used by the data storage device. One or more mapping table(s) associated with the FTL may be stored in the data storage device.

The data storage device may include a separate volatile memory (e.g., dynamic random access memory (DRAM) or static RAM (SRAM)) that may be used to rapidly access the mapping table(s). However, when power supplied to the data storage device is interrupted, the mapping table(s) stored in the volatile memory may be lost. Further, as the size of mapping table(s) increases, the amount of volatile memory used for storing mapping table(s) also increases, thereby driving up the cost and physical size of the data storage device.

SUMMARY

Embodiments of the inventive concepts provide a storage device capable of reducing access time for accessing mapping tables, a storage system including a storage device capable of reducing access time for accessing mapping tables, and a method of operating a storage device capable of reducing access time for accessing mapping tables.

Embodiments of the inventive concepts provide a storage device including a main storage and a storage controller that controls the main storage. The main storage stores data and includes a plurality of nonvolatile memory devices. The storage controller loads at least one of (a) at least a portion of mapping tables and (b) at least one of a portion of directories to a host memory buffer included in an external host device, based on at least one of a size of the host memory buffer and locality information associated with a data access pattern of the external host device. The mapping tables are stored in the nonvolatile memory devices and the mapping tables indicate a mapping relationship between a physical address and a logical address of corresponding ones of the nonvolatile memory devices. The directories store address information of the mapping tables stored in the nonvolatile memory devices.

Embodiments of the inventive concepts further provide a storage system including a storage device and a host device. The storage device includes a main storage that stores data and a storage controller that controls the main storage, and the main storage includes a plurality of nonvolatile memory devices. The host device includes a host memory and controls the storage device. The host device allocates a portion of the host memory as a host memory buffer that is accessible by the storage controller, in response to a request from the storage device. The storage controller loads at least one of (a) at least a portion of mapping tables and (b) at least one of a portion of directories to the host memory buffer, based on at least one of a size of the host memory buffer and locality information associated with a data access pattern of the host device. The mapping tables are stored in the nonvolatile memory devices and the mapping tables indicate a mapping relationship between a physical address and a logical address of corresponding ones of the nonvolatile memory devices. The directories stores address information of the mapping tables stored in the nonvolatile memory devices.

Embodiments of the inventive concepts still further provide a method of operating a storage device including a main storage that stores data and a storage controller that controls the main storage. The main storage includes a plurality of nonvolatile memory devices. The method includes receiving, by the storage controller from an external host device, a size information of a host memory buffer included in the external host device that controls the storage device; and loading, by the storage controller, at least one of (a) at least a portion of mapping tables and (b) at least one of a portion of directories to the host memory buffer included in the external host device, based on at least one of a size of the host memory buffer and locality information associated with a data access pattern of the external host device. The mapping tables are stored in the nonvolatile memory devices and the mapping tables indicate a mapping relationship between a physical address and a logical address of corresponding ones of the nonvolatile memory devices, and the directories store address information of the mapping tables. The method further includes performing, by the storage controller, a memory operation, designated by a command, on a memory region of the nonvolatile memory devices designated by an address, by referring to the host memory buffer based on the command and the address received from the external host device.

Embodiments of the inventive concepts also provide a storage device including a main storage including nonvolatile memory devices that store directories and mapping tables, wherein the mapping tables indicate a mapping relationship between a physical address and a logical address of corresponding ones of the nonvolatile memory devices, and the directories store address information of the mapping tables stored in the nonvolatile memory devices; and a storage controller configured to control the main storage and selectively load the directories and the mapping tables from the nonvolatile memory devices to a host memory buffer of an external host device in a plurality of modes based on a size of the host memory buffer and a counted value of a number of misses indicative that a logical address received from the external host device does not match one of the entries in the host memory buffer. The plurality of modes include a first mode that includes preferential loading of the directories from the nonvolatile memory devices to the host memory buffer, a second mode that includes merged loading of the directories and the mapping tables from the nonvolatile memory devices to the host memory buffer, and a third mode that includes preferential loading of the mapping tables from the nonvolatile memory devices to the host memory buffer.

Accordingly, when a size of the host memory buffer is not capable of covering overall address space of mapping tables of the main storage in the storage device, the storage controller may dynamically load at least a portion of the mapping tables and a portion of the directories to the host memory buffer based on at least one of the size of the host memory buffer and the locality information associated with data access pattern. The storage controller may perform a memory operation on a memory location designated by a physical address corresponding to a logical address by referring to the host memory buffer. The storage controller may reduce access time for accessing the mapping tables.

BRIEF DESCRIPTION OF THE DRAWINGS

Illustrative, non-limiting example embodiments will be more clearly understood from the following detailed description in conjunction with the accompanying drawings.

DETAILED DESCRIPTION OF THE EMBODIMENTS

Various example embodiments will be described more fully hereinafter with reference to the accompanying drawings, in which some example embodiments are shown.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
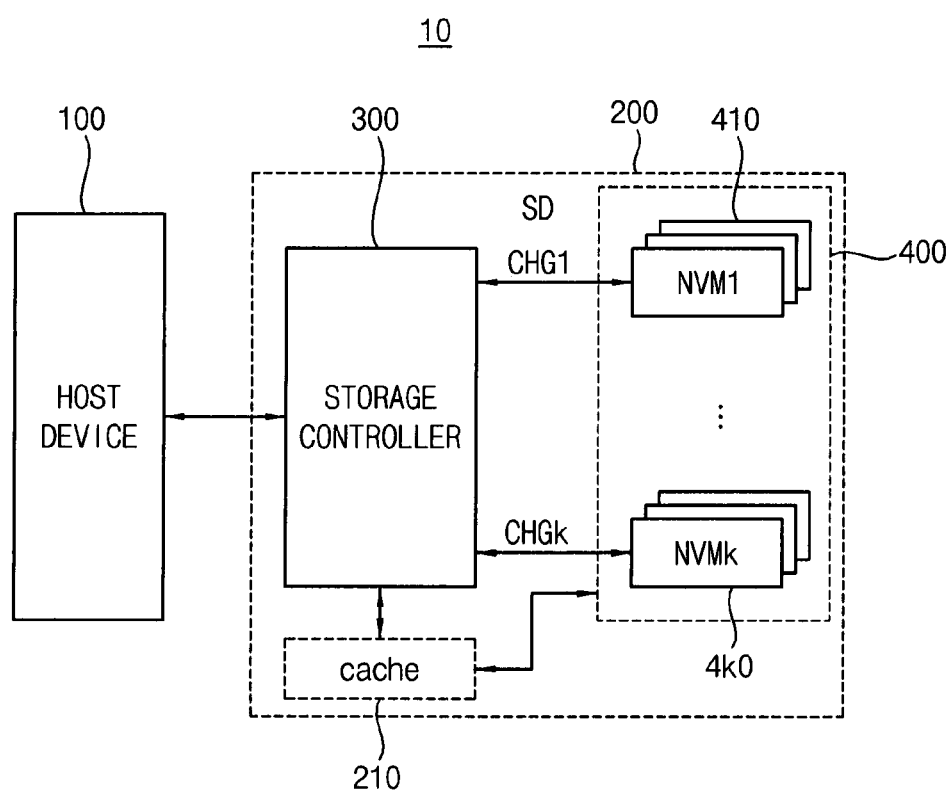
FIG. 1 illustrates a block diagram of a data storage system (or, a storage system) according to embodiments of the inventive concepts.

FIG. 1 illustrates a block diagram of a storage system (or, a data storage system) according to embodiments of the inventive concepts.

Referring to FIG. 1, a storage system 10 includes a host device 100 and a storage device (or a solid state drive (i.e., SSD)) 200.

The host device 100 may control overall operation of the storage device 200. The host device 100 may exchange signals with storage device 200. The signals exchanged between the host device 100 and the storage device 200 may include for example a command, an address, data, or other types of signals.

The storage device 200 includes a storage controller 300 and a main storage 400, and the main storage 400 may include a plurality of nonvolatile storages (i.e., nonvolatile memory devices) 410~4k0. Each of the nonvolatile storages 410~4k0 (i.e., NVM1~NVMk) may include NAND flash memories. Here, k is an integer greater than two.

The storage device 200 may further include a cache 210. The cache 210 is connected to the storage controller 300 and the main storage 400 and may temporarily store meta data stored in the nonvolatile storages 410~4k0. The storage controller 300 may set the main storage 400 based on the meta data that is temporarily stored in the cache 210.

The storage controller 300 may exchange the signals such as a command, an address, data, or other types of signals with the host device 100. The storage controller 300 may write data in a corresponding nonvolatile storage and read data from a corresponding nonvolatile storage according to a command The plurality of nonvolatile storages 410~4k0 may be used as a storage medium of the storage device 200. The nonvolatile storages 410~4k0 may be connected to the storage controller 300 through a plurality of channel groups CHG1~CHGk. Each of the channel groups CHG1~CHGk may include at least one channel. One or more nonvolatile storages may be connected to one channel group. A nonvolatile storage connected to one channel group may be connected to the same data bus.

Although not illustrated, the storage device 200 may further include a pad to be connected to the host device 100. The storage device 200 can be easily attached to or detached from the host device 100 through the pad.

The pad may be formed inside the storage device 200 or may be formed in the form of connector outside the storage device 200. In some embodiments, the storage device 200 may not include the pad and may be connected to the host device 100 through a routing process.

Figure 2:
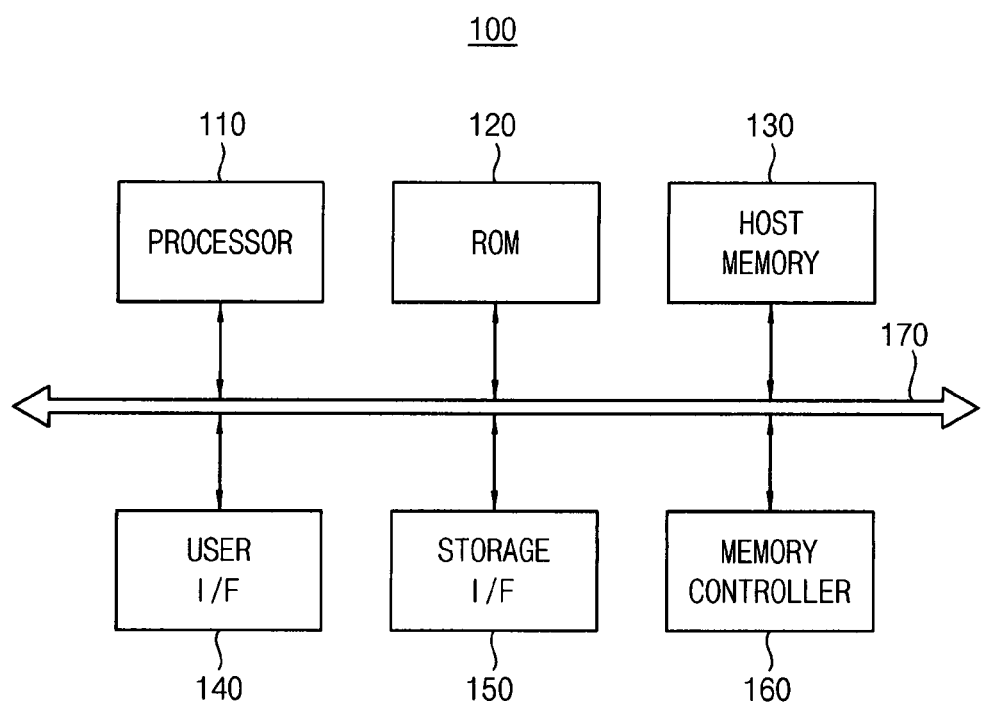
FIG. 2 illustrates a block diagram of the host device in FIG. 1 according to embodiments of the inventive concepts.

FIG. 2 illustrates a block diagram of the host device in FIG. 1 according to embodiments of the inventive concepts.

Referring to FIG. 2, the host device 100 includes a processor 110, a read-only memory (ROM) 120, a host memory 130, a user interface (UF) 140, a storage interface (I/F) 150, a memory controller 160 and a bus 170.

The bus 170 may refer to a transmission channel via which data is transmitted between the processor 110, the ROM 120, the host memory 130, the user interface 140, the storage interface 150 and the memory controller 160 of the host device 100.

The ROM 120 may store various application programs. For example, application programs supporting storage protocols such as Advanced Technology Attachment (ATA), Small Computer System Interface (SCSI), embedded Multi Media Card (eMMC), and Universal Flash storage (UFS) protocols and NVMe may be stored in ROM 120.

The host memory 130 may temporarily store data or programs.

The storage interface 150 may include interfaces supporting storage protocols such as SATA, SAS, eMMC, UFS and NVMe. The host device 100 may perform interfacing with the storage device 200 through NVMe protocol.

The user interface 140 may be a physical or virtual medium for exchanging information between a user and the host device 100, a computer program, etc., and includes physical hardware and logical software. For example, the user interface 140 may include an input device for allowing the user to manipulate the host device 100, and an output device for outputting a result of processing an input of the user.

The processor 110 may control overall operations of the host device 100. The processor 110 may for example generate a request (or, a command) for storing data in the storage device 200 or a request (or a command) for reading data from the storage device 200 by using an application stored in the ROM 120, and transmit the request to the storage device 200 via the storage interface 150.

The memory controller 160 may control the host memory 130 under control of the processor 110. The memory controller 160 may assign a portion of the host memory 130 as a host memory buffer that is accessible by the storage device 200 under control of the processor 110.

Figure 3:
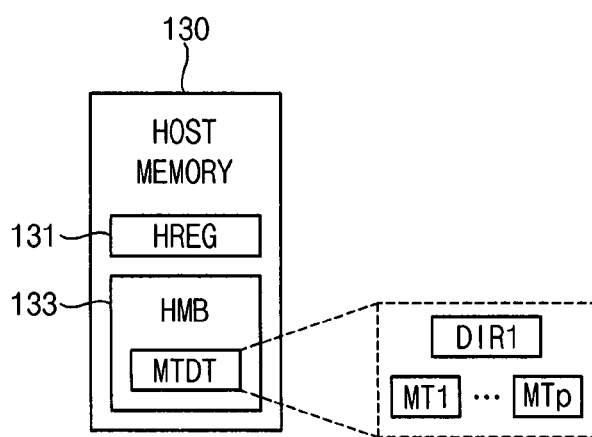
FIG. 3 illustrates an example of the host memory in FIG. 2 according to embodiments.

FIG. 3 illustrates an example of the host memory in FIG. 2 according to embodiments of the inventive concepts.

Referring to FIG. 3, the host memory 130 includes a host region 131 and a host memory buffer (HMB) 133. The host region 131 may be used by the host device 100 and the host memory buffer 133 may be used by the storage device 200.

The host memory buffer 133 may store meta data MTDT such as a directory DIR1 and mapping tables MT1~MTp that the storage controller 300 loads.

Each of the mapping tables MT1~MTp indicates a mapping relationship between a physical address and a logical address of a corresponding one of nonvolatile memory devices included in the nonvolatile storages 410~40k, and the directory DIR1 may store address information of the mapping tables stored in one nonvolatile memory device. The storage controller 300 may map (convert) a logical address from the host device 100 to a physical address by referring to the meta data MTDT, and may perform a memory operation on at least one of the nonvolatile memory devices based on the physical address.

The processor 110 may load source codes stored in the main storage 400 to the host region 131 in the host memory 130 and may run various software such as an operating system and an application by executing the codes loaded to the host region 131. In addition, the processor 110 loads data stored in the storage device 200 and processes the data loaded to the host region 131. The processor 110 may store a portion of the data loaded to the host region 131 in the storage device 200 and the portion of the data is determined to be retained for a long time.

Figure 4:
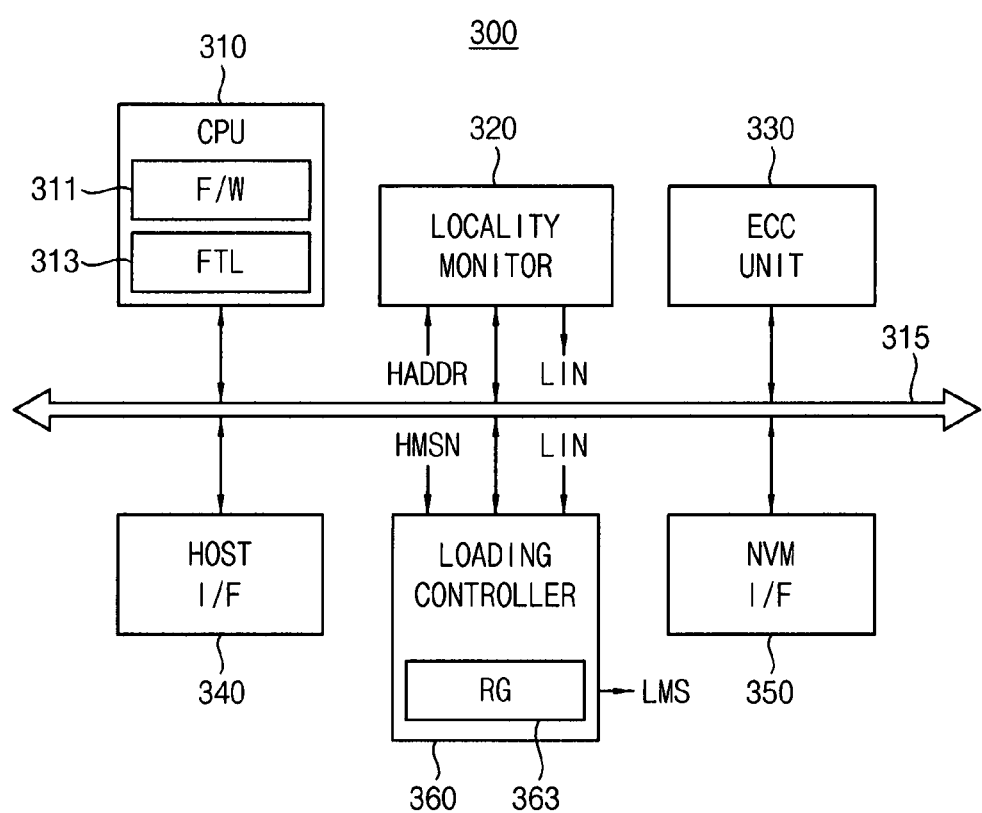
FIG. 4 illustrates a block diagram of the storage controller in FIG. 1 according to embodiments of the inventive concepts.

FIG. 4 illustrates a block diagram of the storage controller in FIG. 1 according to embodiments of the inventive concepts.

Referring to FIG. 4, the storage controller 300 includes a processor 310 such as a central processing unit (CPU), a locality monitor 320, an error correction code (ECC) unit 330, a host interface (I/F) 340, a loading controller 360, a nonvolatile memory interface (I/F) 350, and a bus 315.

The bus 315 may refer to a transmission channel via which data is transmitted between the processor 310, the locality monitor 320, the ECC unit 330, the host interface 340, the loading controller 360, and the nonvolatile memory interface 350 of the storage controller 300.

The processor 310 may perform an operation for data exchange between the host device 100 and the nonvolatile storages 410~4k0. The processor 310 may execute firmware 311 and a flash translation layer (FTL) 313.

The host interface 340 is connected to the host device 100 and the nonvolatile memory interface 350 is connected to the nonvolatile storages 410~4k0. The processor 310 may communicate with the host device 100 via the host interface 340. The host interface 340 may for example be implemented using, but not limited to, a SATA interface, a Parallel Advanced Technology Attachment (PATA) interface, USB or SAS interface, an eMMC interface, a UFS interface or an eMMC interface.

The processor 310 may communicate with the nonvolatile storages 410~4k0 through nonvolatile memory interface 350. The nonvolatile memory interface 350 may be connected to each of the nonvolatile storages 410~4k0.

The ECC unit 330 may generate an error correction code (ECC) for data which is received from the host device 100 using various engines during a write operation. During a read operation, the ECC unit 330 may perform error detection and error correction on data read from the nonvolatile storages 410~4k0 to provide the data to the host device 100.

The locality monitor 320 may monitor locality of physical addresses based on a host address HADDR (i.e., a logical address) received from the host device 100, the host address HADDR may indicate access of the host device 100 to the main storage, and may provide the loading controller 360 with locality information LIN indicating the physical address has the locality.

Here, locality indicates how often data is used, and when the same data is repeatedly used within a short time, or spatially nearby pieces of data are accessed within a short time, data may be referred to as having high locality. The locality monitor 320 may determine data whose number of uses is large or usage frequency is high as having high locality and data whose number of uses is small or usage frequency is low as having low locality. The locality information LIN in this case may indicate either high locality or low locality based on how often the data is used.

Locality of data may be otherwise referred to as locality of a memory address where the corresponding data is stored. Accordingly, the locality monitor 320 may determine a memory address whose number of accesses of instructions is large or access frequency of instructions during a certain time period is high as having high locality, and may determine a memory address whose number of accesses is small or access frequency is low as having low locality. The locality information LIN in this case may indicate either high locality or low locality based on the number of accesses to a memory address.

The loading controller 360 may control loading of the directories and the mapping tables to the host memory buffer 133 based on the locality information LIN and size information HMSN associated with a size of the host memory buffer 133. The loading controller 360 may generate a loading mode signal LMS associated with controlling the loading of the directories and the mapping tables and may provide the nonvolatile storages 410~4k0 with the loading mode signal LMS through the nonvolatile memory interface 350. The loading controller 360 may include a register 363 that stores reference values.

Each of the nonvolatile storages 410~4k0 may receive the loading mode signal LMS and may load a directory and a portion of the mapping tables stored therein to the host memory buffer 133 through the storage controller 300 based on one of a plurality of loading modes, designated by the loading mode signal LMS.

Figure 5:
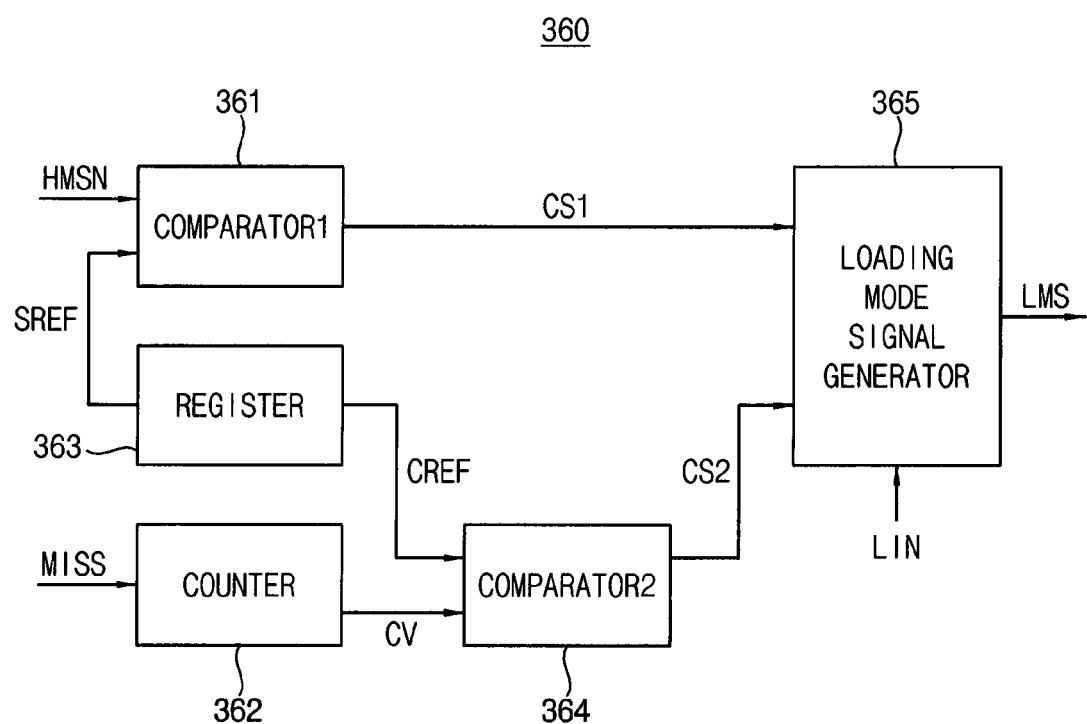
FIG. 5 illustrates a block diagram of an example of the loading controller in FIG. 4 according to embodiments of the inventive concepts.

FIG. 5 illustrates a block diagram of an example of the loading controller in FIG. 4 according to embodiments of the inventive concepts.

Referring to FIG. 5, the loading controller 360 includes a first comparator (comparator1) 361, a counter 362, a register 363, a second comparator (comparator2) 364 and a loading mode signal generator 365.

The first comparator 361 compares the size information HMSN with a first reference value SREF to output a first comparison signal CS1. The counter 362 outputs a counting value CV by counting a number of misses MISS indicating that the logical address received from the host device 100 does not match one of entries in the host memory buffer 133. The counting value CV may be characterized as a miss rate of access requests of the host memory buffer 133. The second comparator 364 compares the counting value CV with a second reference value CREF to output a second comparison signal CS2. The register 363 stores the first reference value SREF and the second reference value CREF, provides the first reference value SREF to the first comparator 361 and provides the second reference value SREF to the second comparator 364.

The loading mode signal generator 365 receives the first comparison signal CS1, the second comparison signal CS2 and the locality information LIN and generates the loading mode signal LMS based on the first comparison signal CS1, the second comparison signal CS2 and the locality information LIN.

When the first comparison signal CS1 indicates that the size information HMSN is smaller than the first reference value SREF (i.e., a size reference value), the loading mode signal generator 365 may generate the loading mode signal LMS designating preferential loading of the portion of the directories in response to the first comparison signal CS1 and the locality information LIN. The portion of the directories may be associated with addresses having high locality. When the first comparison signal CS1 indicates that the size information HMSN is equal to or greater than the first reference value SREF, the loading mode signal generator 365 may generate the loading mode signal LMS designating merged loading of at least one of the directories and the portion of the mapping tables in response to the first comparison signal CS1 and the locality information LIN. The at least one of the directories may be associated with addresses having high locality, the portion of the mapping tables may be associated with addresses having high locality, or the at least one of the directories and the portion of the mapping tables may be associated with addresses having high locality, respectively. When the loading mode signal LMS designates the merged loading, the storage controller 300 loads at least one of the directories and the mapping tables to the host memory buffer 133 with a ratio of 1: N (N is a natural number greater than two).

In an example embodiment, the storage controller 300 may determine a value of N based on the size information HMSN (or a size) of the host memory buffer 133. In an example embodiment, the storage controller 300 may determine the value of N based on the locality information LIN and the size information HMSN of the host memory buffer 133. For example, the value of N of the mapping tables associated with the addresses having high locality may be determined based on the locality information LIN and/or the size information HMSN of the host memory buffer 133. That is, the storage controller 300 may determine a ratio of loading of the directories and the mapping tables to the host memory buffer 133 based on at least one of the locality information LIN and the size information HMSN of the host memory buffer 133. For example, if a number of the mapping tables associated with the addresses having high locality increases, the storage controller 300 may increase the value of N. For example, if a number of the mapping tables associated with the addresses having high locality decreases, the storage controller 300 may decrease the value of N.

When the second comparison signal CS2 indicates the counting value CV is equal to or greater than the second reference value CREF (i.e., a miss reference value), the loading mode signal generator 365 may generate the loading mode signal LMS that designates updating a portion of the loaded directories and the mapping tables in response to the second comparison signal CS2. When the loading mode signal LMS designates the updating, each of the nonvolatile storages 410~4k0 may load, to the host memory buffer 133, one of another portion of the directories and another portion of the mapping tables through the storage controller 300.

The loading mode signal LMS may designate one of a plurality of loading modes. The plurality of loading modes may include a first loading mode, a second loading mode and a third loading mode. As mentioned above, the first loading mode may designate the preferential loading of the portion of the directories. As mentioned above, the second loading mode may designate the merged loading of at least one of the directories and the portion of the mapping tables. The third loading mode may designate the preferential loading of the mapping tables.

Figure 6:
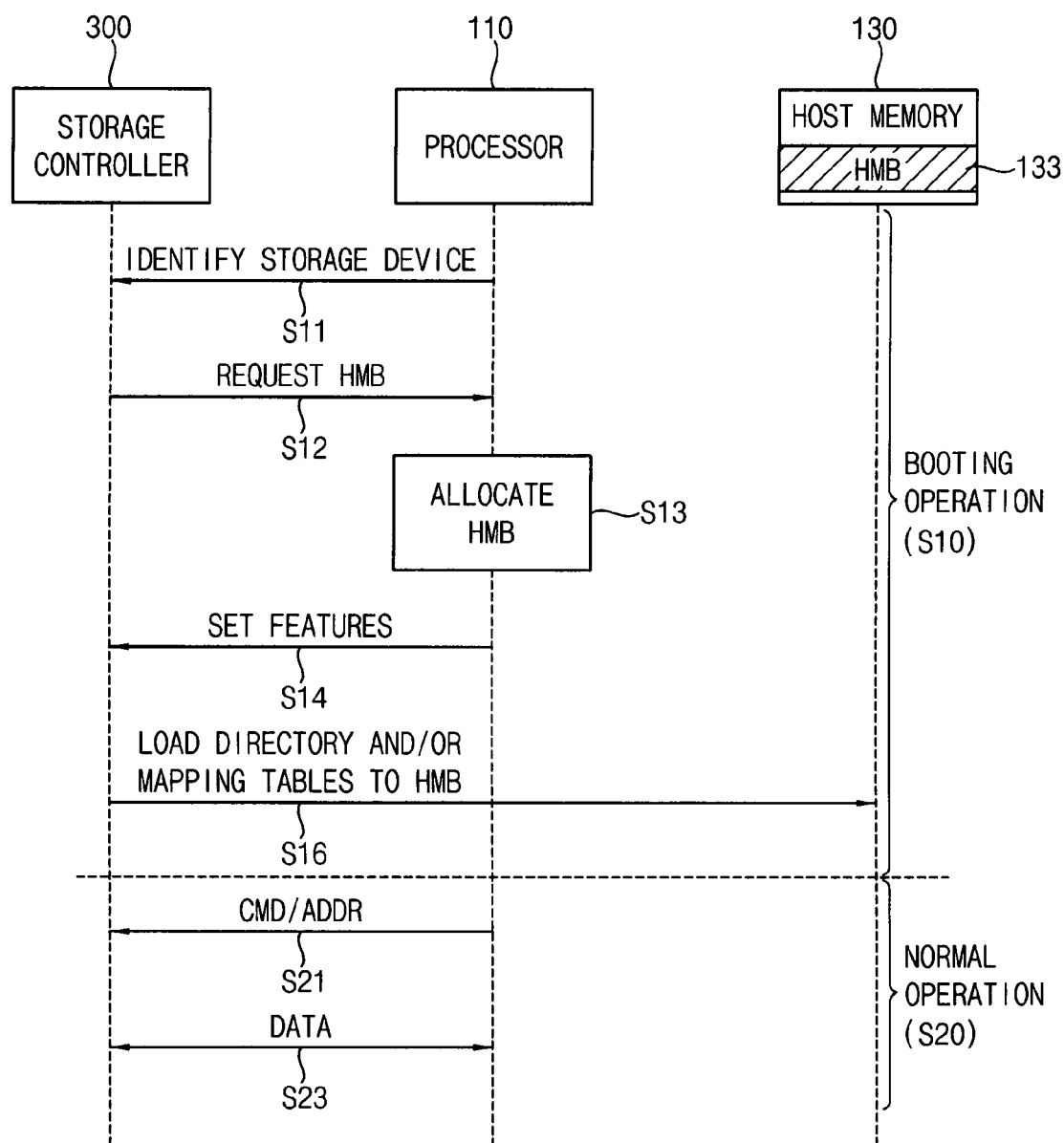
FIG. 6 illustrates an example of operation of the storage system of FIG. 1.

FIG. 6 illustrates an example of operation of the storage system of FIG. 1.

Referring to FIGS. 1 through 6, an operation S10 represents a booting process (or booting sequence) of the storage system 10. Operations S11, S12, S13, S14 and S16 may be performed during operation S10. In the operation S11, the processor 110 identifies the storage controller 300. In the operation S12, the storage controller 300 issues a request associated with use of the host memory buffer 133 to the processor 110.

In the operation S13, the processor 110 assigns (or, allocates) a portion of the host memory 130 as the host memory buffer 133 by referring to the request of the storage controller 300. In the operation S14, the processor 110 notifies an allocation result and size information to the storage controller 300 through a set feature command. In operation S16, the storage controller 300 loads at least one of (a) a portion of the directories and (b) at least a portion of the mapping tables to the host memory buffer 133 based on the size information.

In an operation S20, the host device 100 and the storage device 200 perform normal operation. Operations S21 and S23 may be performed in the operation S20.

In the operation S21, the host device 100 transmits the command CMD and the address ADDR to the storage device 200. In the operation S23, the storage controller 300 converts the address ADDR to a physical address by referring to the at least a portion of the mapping tables and the portion of the directories loaded to the host memory buffer 133 and performs a memory operation designated by the command CMD to a memory location designated by the physical address. According to a result of the memory operation, data DATA may be exchanged between the storage device 200 and the host device 100.

Figures 7A, 7B:
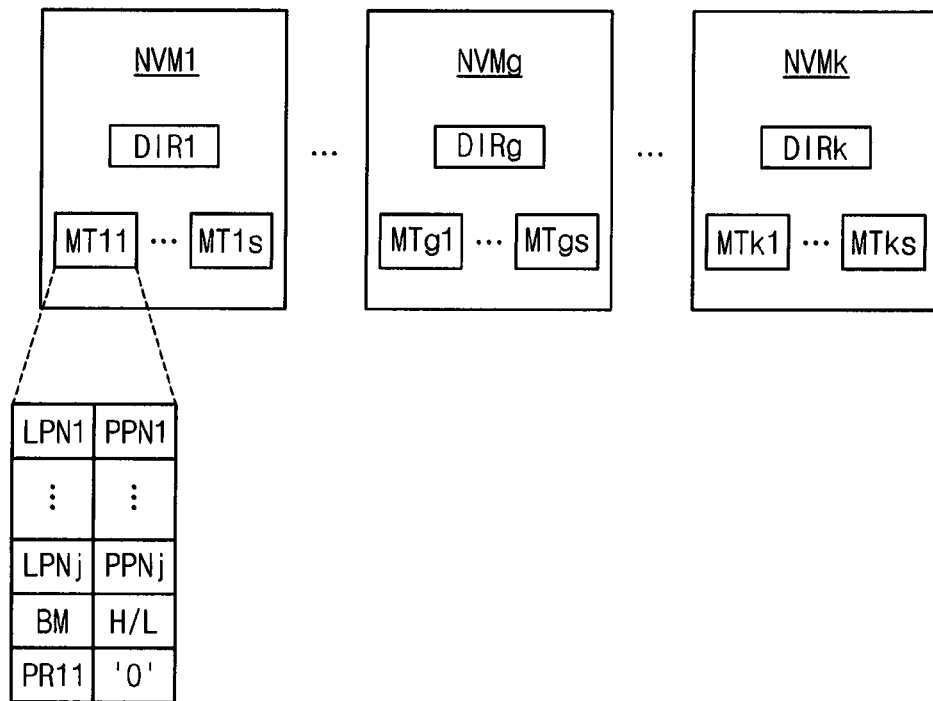
FIG. 7A illustrates a directory and mapping tables stored in each of the nonvolatile memory devices in FIG. 1.
FIG. 7B illustrates an example of the directory in FIG. 7A.

FIG. 7A illustrates a directory and mapping tables stored in each of the nonvolatile memory devices in FIG. 1.

Referring to FIG. 7A, nonvolatile memory devices NVM1~NVMk included in the main storage 400 are illustrated.

For example, a directory DIR1 and mapping tables MT11~MT1s may be stored in a meta region in the nonvolatile memory device NVM1 of the nonvolatile memory devices NVM1~NVMk, a directory DIRg and mapping tables MTg1~MTgs may be stored in a meta region in the nonvolatile memory device NVMg of the nonvolatile memory devices NVM1~NVMk, and a directory DIRk and mapping tables MTk1~MTks may be stored in a meta region in the nonvolatile memory device NVMk of the nonvolatile memory devices NVM1~NVMk.

The mapping table MT11 may store logical page numbers (logical addresses) LPN1~LPNj of memory blocks in the nonvolatile memory device NVM1, physical page numbers (physical addresses) PPN1~PPNj corresponding to the logical page numbers LPN1~LPNj, respectively, a bit map BM and first priority information PR11. The bit map BM may represent a locality of the mapping table MT11 and may have a high/low level. The first priority information PR11 may represent access importance degree of the mapping table MT11.

The processor 310 of the storage controller 300 may determine a logic level of the bit map BM and may determine a value of the first priority information PR11 based on the locality and access frequency to a particular memory block during a program operation and a read operation on each of memory blocks in each of the nonvolatile memory devices NVM1~NVMk.

FIG. 7B illustrates an example of the directory in FIG. 7A.

Referring to FIG. 7B, the directory DIR1 may store address information MPPN1~MPPNs of the mapping tables MT11~MT1s, respectively and second priority information PR21. The address information MPPN1 may include physical address information of a page PG2 of memory block BLK1, at which is stored in the mapping table MT11. The processor 310 of the storage controller 300 may determine a value of the second priority information PR21 based on the bit map BM and the first priority information of each of the mapping tables MT11~MT1s stored in the directory DIR1.

Figure 8:
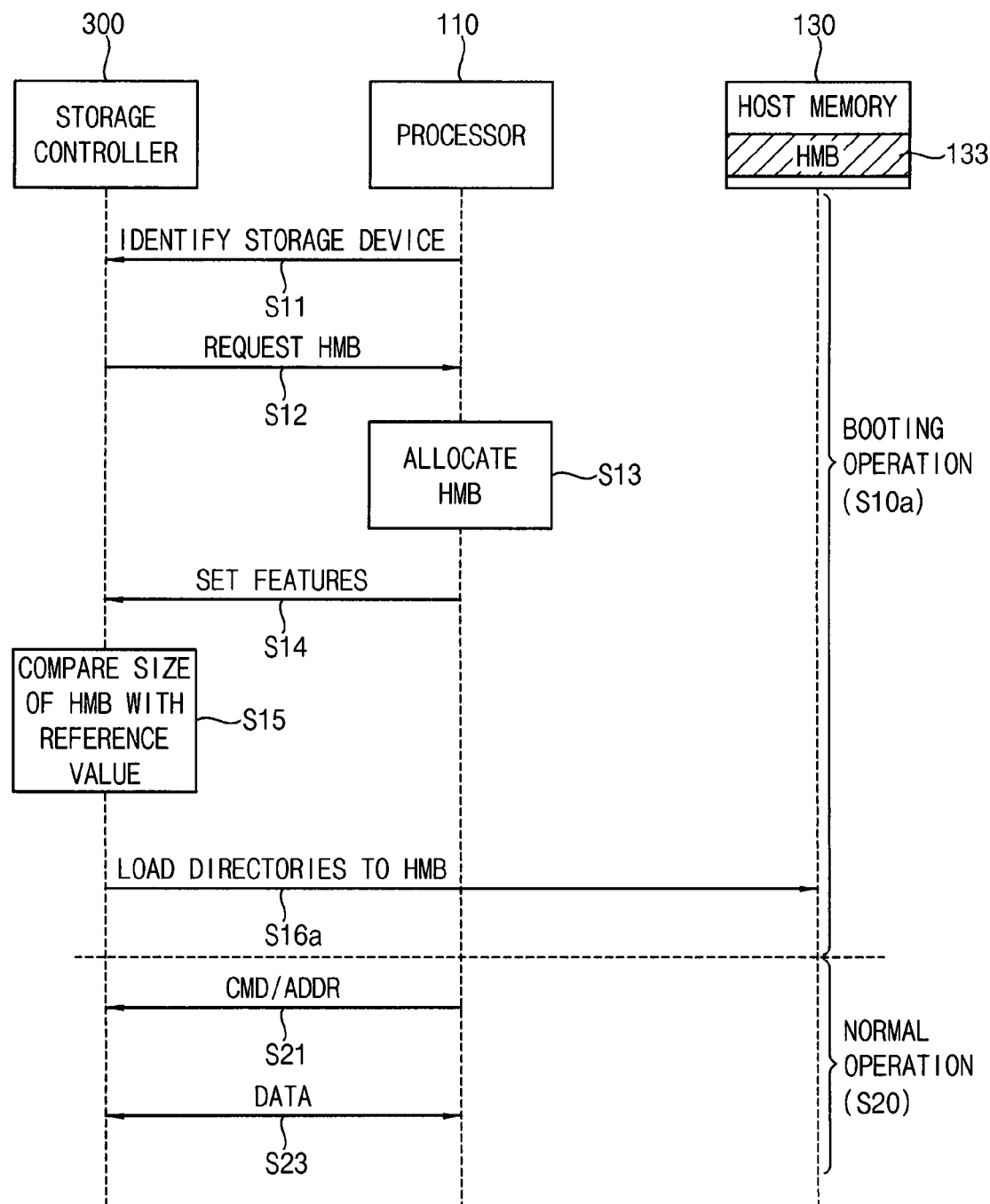
FIG. 8 illustrates another example of operation of the storage system of FIG. 1.

FIG. 8 illustrates another example of operation of the storage system of FIG. 1.

In FIG. 8, it is assumed that the size of the host memory buffer 133 is smaller than the first reference value.

Operations associated with FIG. 8 differ from the operations associated with FIG. 6 in that the operations associated with FIG. 8 further include an operation S15, and an operation S16a in FIG. 8 differs from the operation S16 in FIG. 6. Therefore, booting process S10a in FIG. 8 differs from the booting process S10 in FIG. 6. Description of operations in FIG. 8 that are the same as in FIG. 6 may be omitted from the following.

Referring to FIG. 8, an operation S10a represents a booting process of the storage system 10. Operations S11, S12, S13, S14, S15 and S16a may be performed during operation S10a. In the operation S15, the storage controller 300 compares the size information HMSN of the host memory buffer 133 with the first reference value (SREF) and provides the main storage 400 with the loading mode signal LMS indicating that the size information HMSN is smaller than the first reference value. In the operation S16a, the storage controller 300 loads preferentially a portion of the directories to the host memory buffer 133 based on the second priority information (PR21) of the directories.

Figure 9:
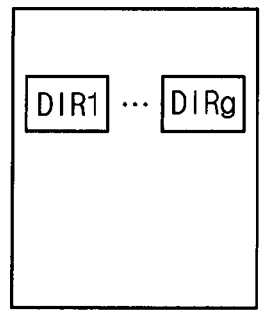
FIG. 9 illustrates the host memory buffer when the operation associated with FIG. 8 is performed.

FIG. 9 illustrates the host memory buffer when the operation associated with FIG. 8 is performed.

Referring to FIG. 9, when a size of the host memory buffer 133 is smaller than the first reference value, directories DIR1~DIRg of the directories DIR1~DIRk may be loaded to the host memory buffer 133 by the storage controller 300.

Figure 10:
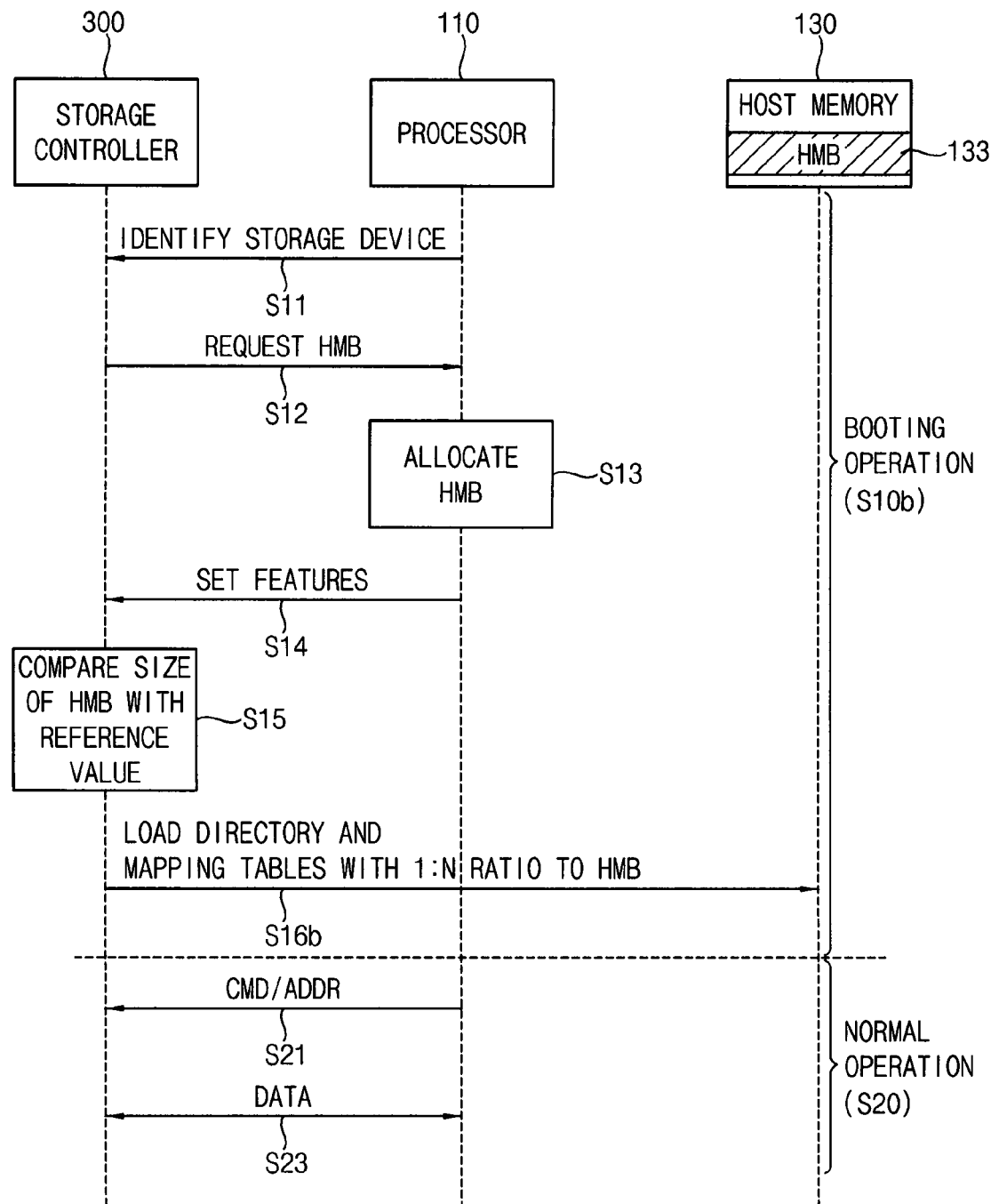
FIG. 10 illustrates another example of operation of the storage system of FIG. 1.

FIG. 10 illustrates another example of operation of the storage system of FIG. 1.

In FIG. 10, it is assumed that the size of the host memory buffer 133 is equal to or greater than the first reference value.

Operations associated with FIG. 10 differ from the operations associated with FIG. 6 in that the operations associated with FIG. 10 further include an operation S15, and an operation S16b in FIG. 10 differs from the operation S16 in FIG. 6. Therefore, booting process S10b in FIG. 10 differs from the booting process S10 in FIG. 6. Description of operations in FIG. 10 that are the same as in FIG. 6 may be omitted from the following.

Referring to FIG. 10, an operation S10b represents a booting process of the storage system 10. Operations S11, S12, S13, S14, S15 and S16b may be performed during operation S10b. In the operation S15, the storage controller 300 compares the size information HMSN of the host memory buffer 133 with the first reference value and provides the main storage 400 with the loading mode signal LMS indicating that the size information HMSN is equal to or greater than the first reference value. In the operation S16b, the storage controller 300 loads at least one of the directories and a portion of the mapping table to the host memory buffer 133 based on the priority information and the locality information LIN.

Figure 11:
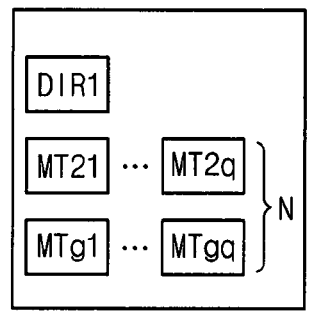
FIG. 11 illustrates the host memory buffer when the operation associated with FIG. 10 is performed.

FIG. 11 illustrates the host memory buffer when the operation associated with FIG. 10 is performed.

Referring to FIG. 11, when a size of the host memory buffer 133 is equal to or greater than the first reference value, the directory DIR1 of the directories DIR1~DIRk and some mapping tables MT21~MT2q and MTg1~MTgq may be loaded to the host memory buffer 133 by the storage controller 300. The directory DIR1 and the mapping tables MT21~MT2q and MTg1~MTgq may be loaded to the host memory buffer 133 with a ratio of 1:N (N is a natural number greater than two). The storage controller 300 may adjust a value of N based on the size information HMSN and the locality information LIN. That is, the storage controller 300 may adjust the value of N according to a number of the mapping tables associated with the addresses having high locality at a given size of the host memory buffer 133. The number of the mapping tables associated with the addresses having high locality may be obtained from the locality information LIN.

The directory DIR1 and the mapping tables MT21~MT2q and MTg1~MTgq may be associated with different nonvolatile memory devices, respectively. The directory DIR1 and the mapping tables MT21~MT2q and MTg1~MTgq may be independent from each other.

Figure 12:
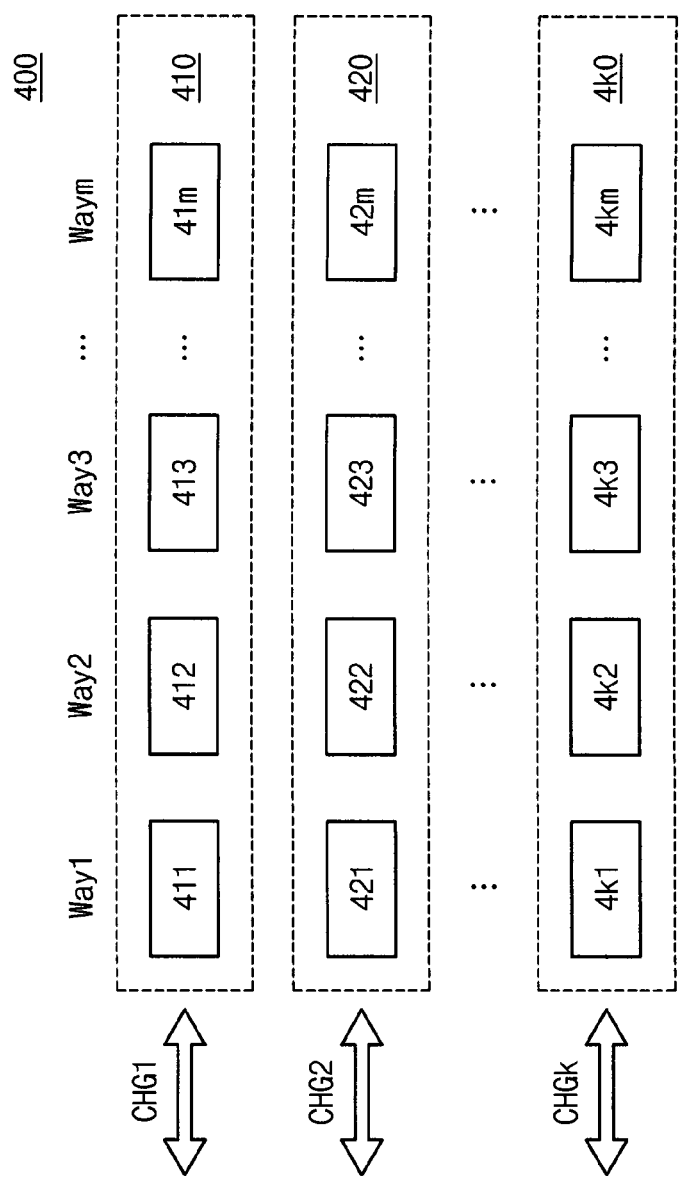
FIG. 12 illustrates an example of a plurality of channels and ways of the main storage in FIG. 1 according to embodiments of the inventive concepts.

FIG. 12 illustrates an example of a plurality of channels and ways of the main storage in FIG. 1 according to example embodiments.

Referring to FIG. 12, the nonvolatile storages 410~4k0 are coupled to corresponding ones of the plurality of channel groups CHG1~CHGk. As shown, a plurality of nonvolatile memory devices 411~41m of nonvolatile storage 410 coupled to channel group CHG1, a plurality of nonvolatile memory devices 421~42m of nonvolatile storage 420 coupled to channel group CHG2, . . . , and a plurality of nonvolatile memory devices 4k1~4km of nonvolatile storage 4k0 coupled to channel group CHGk may form a plurality of ways Way1~Waym. Here, m is a natural number greater than two. That is, respective m nonvolatile memory devices 411~41m, 421~42m, . . . , 4k1~4km may be included in m ways in each of the channel groups CHG1~CHGk.

A way indicates a unit for dividing nonvolatile memory devices sharing an identical channel. Each of the nonvolatile memory devices may be identified according to channel numbers and way numbers.

Figure 13:
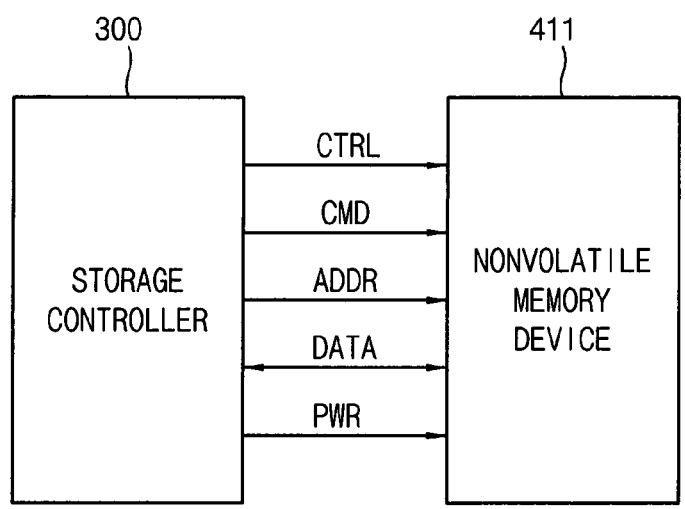
FIG. 13 illustrates a block diagram of a relationship between the storage controller and one nonvolatile memory device in the storage device of FIG. 1.

FIG. 13 illustrates a block diagram of a relationship between the storage controller and one nonvolatile memory device (i.e., one nonvolatile storage) in the storage device of FIG. 1.

Referring to FIG. 13, the nonvolatile memory device 411 may perform an erase operation, a program operation, or a write operation under control of the storage controller 300. The nonvolatile memory device 411 receives a command CMD, an address ADDR and data DATA through input/output lines from the storage controller 300 for performing such operations.

In addition, the nonvolatile memory device 411 receives a control signal CTRL through a control line and receives a power PWR through a power line from the storage controller 300.

Figure 14:
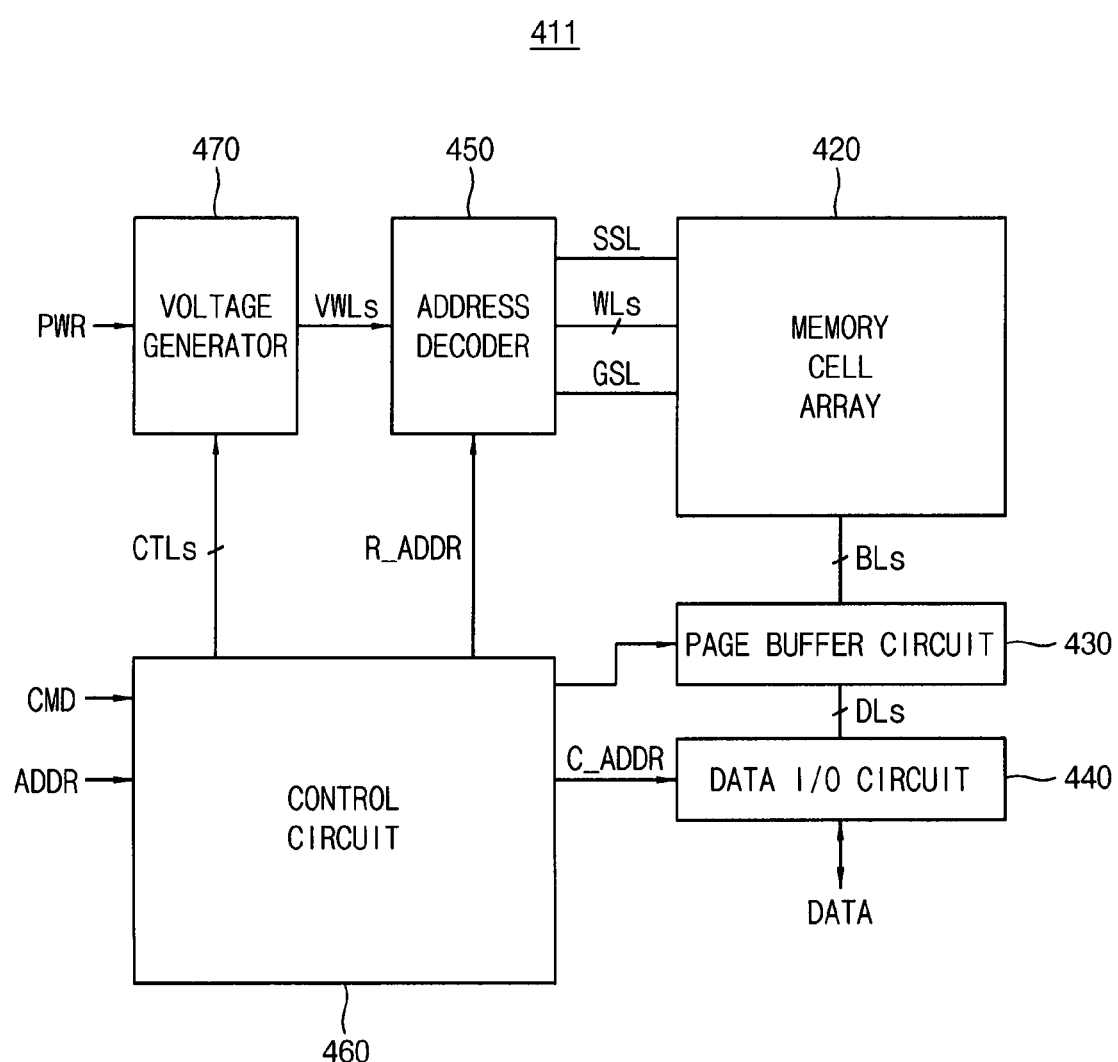
FIG. 14 illustrates a block diagram of the nonvolatile memory device in FIG. 13 according to embodiments of the inventive concepts.

FIG. 14 illustrates a block diagram of the nonvolatile memory device in FIG. 13 according to embodiments of the inventive concepts.

Referring to FIG. 14, the nonvolatile memory device 411 includes a memory cell array 420, an address decoder 450, a page buffer circuit 430, a data input/output (I/O) circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be a three-dimensional memory cell array, which is formed on a substrate in a three-dimensional structure (or a vertical structure). In this case, the memory cell array 420 may include vertical cell strings that are vertically oriented such that at least one memory cell is located over another memory cell.

In other example embodiments, the memory cell array 420 may be a two-dimensional memory cell array, which is formed on a substrate in a two-dimensional structure (or a horizontal structure).

Figure 15:
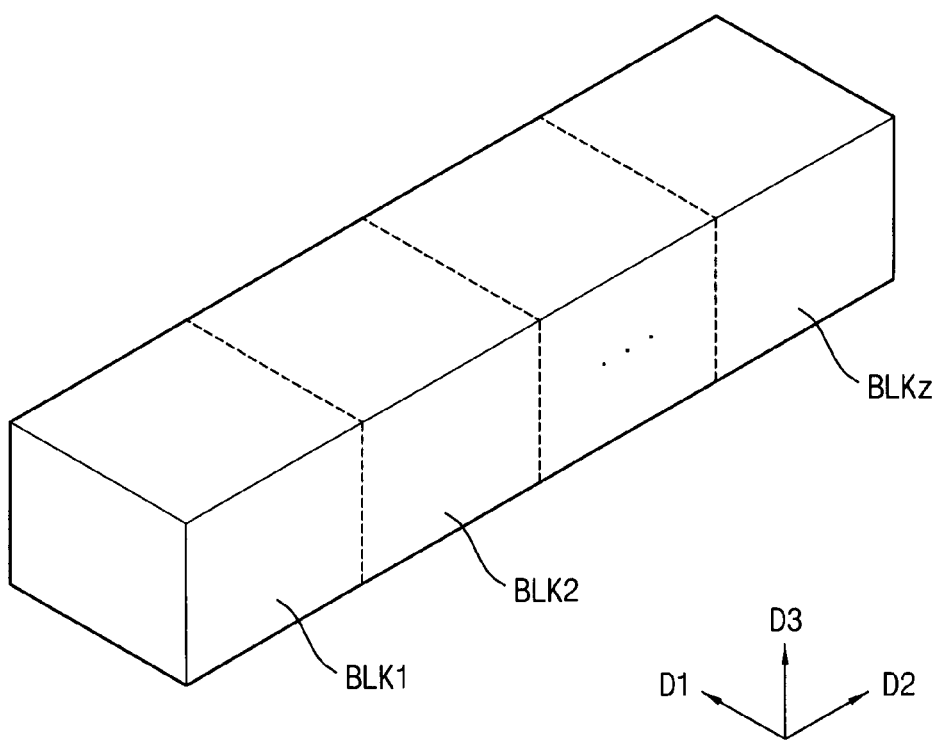
FIG. 15 illustrates a block diagram of the memory cell array in the nonvolatile memory device of FIG. 14.

FIG. 15 illustrates a block diagram of the memory cell array in the nonvolatile memory device of FIG. 14.

Referring to FIG. 15, the memory cell array 420 may include a plurality of memory blocks BLK1 to BLKz. The memory blocks BLK1 to BLKz extend along first through third directions D1, D2 and D3. In an embodiment, the memory blocks BLK1 to BLKz are selected by the address decoder 450 in FIG. 14. For example, the address decoder 450 may select a memory block BLK corresponding to a block address among the memory blocks BLK1 to BLKz.

Figure 16:
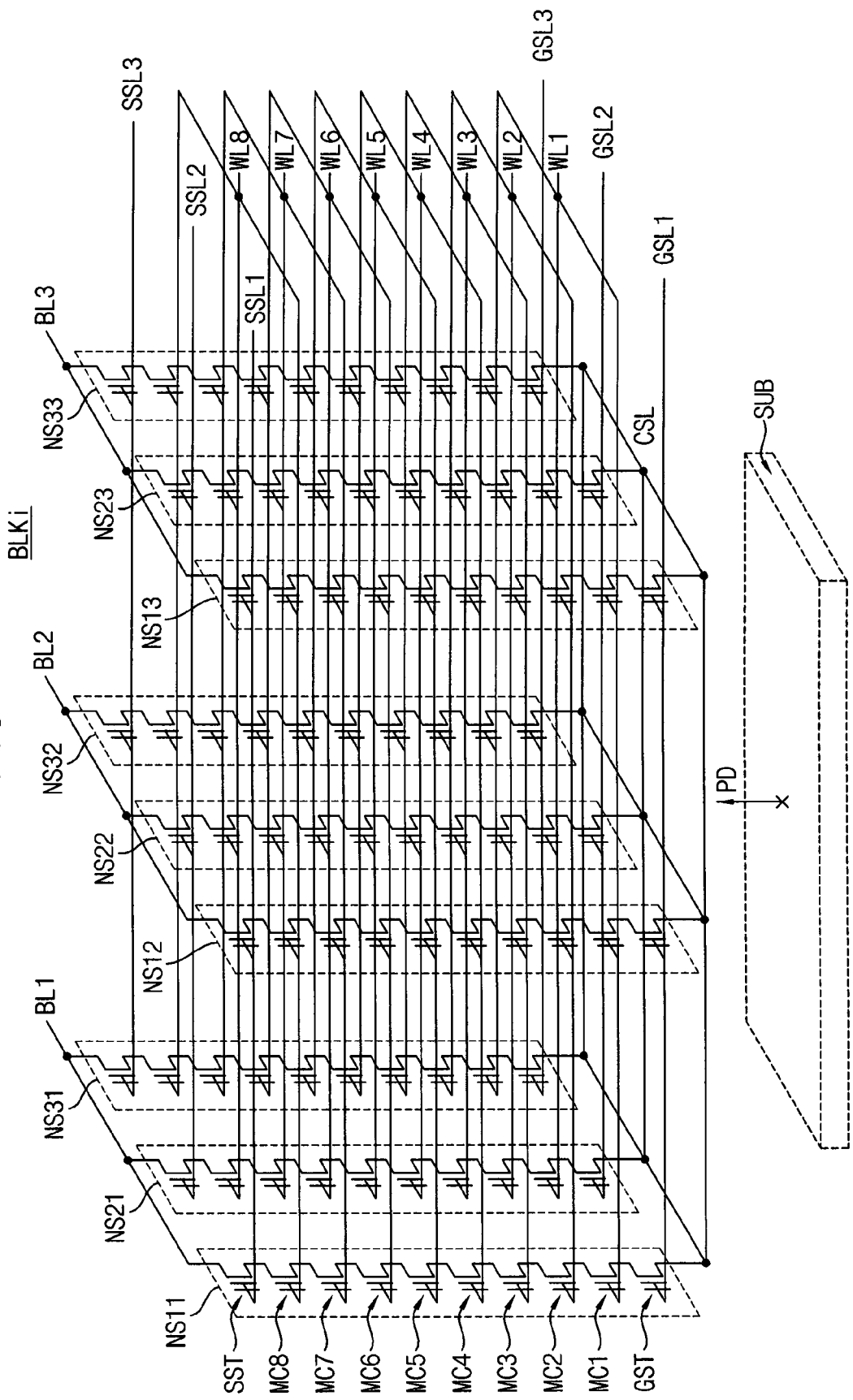
FIG. 16 illustrates a circuit diagram of one of the memory blocks of FIG. 15.

FIG. 16 illustrates a circuit diagram of one of the memory blocks of FIG. 15.

The memory block BLKi of FIG. 16 may be formed on a substrate SUB in a three-dimensional structure (or a vertical structure). For example, a plurality of memory cell strings included in the memory block BLKi may be formed in a direction PD perpendicular to the substrate SUB.

Referring to FIG. 16, the memory block BLKi may include memory cell strings NS11, NS12, NS13, NS21, NS22, NS23, NS31, NS32 and NS33 (which may hereinafter be referred to as memory cell strings NS11 to NS33) coupled between bit-lines BL1, BL2 and BL3 and a common source line CSL. Each of the memory cell strings NS11 to NS33 may include a string selection transistor SST, a plurality of memory cells MC1, MC2, MC3, MC4, MC5, MC6, MC7 and MC8 (which may hereinafter be referred to as memory cells MC1 to MC8), and a ground selection transistor GST. In FIG. 16, each of the memory cell strings NS11 to NS33 is illustrated to include eight memory cells MC1 to MC8. However, example embodiments are not limited thereto. In some example embodiments, each of the memory cell strings NS11 to NS33 may include any number of memory cells.

The string selection transistor SST may be connected to corresponding string selection lines SSL1, SSL2 and SSL3. The plurality of memory cells MC1 to MC8 may be respectively connected to corresponding word-lines WL1, WL2, WL3, WL4, WL5, WL6, WL7 and WL8 (which may hereinafter be referred to as word-lines WL to WL8. The ground selection transistor GST may be connected to corresponding ground selection lines GSL1, GSL2 and GSL3. The string selection transistor SST may be connected to corresponding bit-lines BL1, BL2 and BL3, and the ground selection transistor GST may be connected to the common source line CSL.

Word-lines (e.g., WL1) having the same height may be commonly connected, and the ground selection lines GSL1 to GSL3 and the string selection lines SSL1 to SSL3 may be separated. In FIG. 16, the memory block BLKi is illustrated to be coupled to eight word-lines WL1 to WL8 and three bit-lines BL1 to BL3. However, example embodiments are not limited thereto. In some example embodiments, the memory cell array 420 may be coupled to any number of word-lines and bit-lines.

Figure 17:
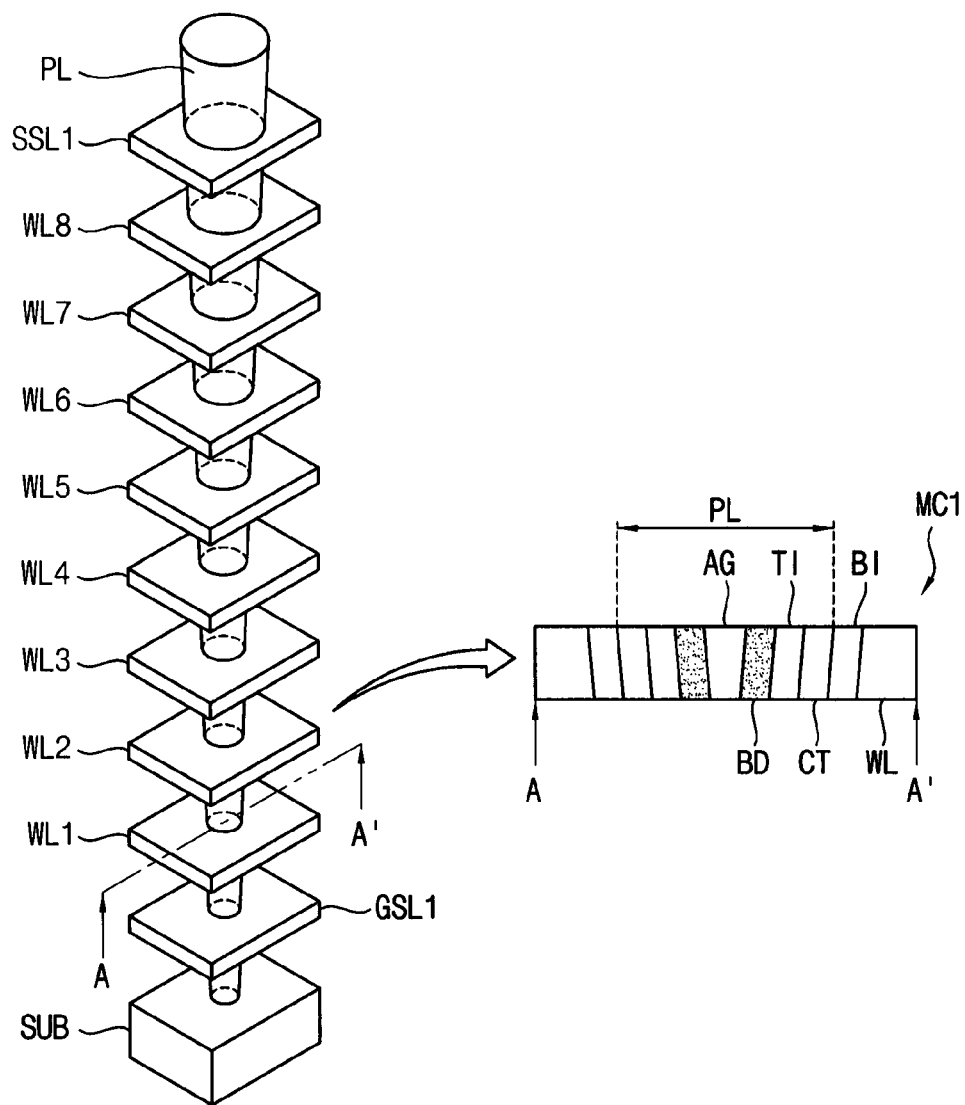
FIG. 17 illustrates an example of a structure of a cell string CS in the memory block of FIG. 16.

FIG. 17 illustrates an example of a structure of a cell string CS (e.g., memory cell string NS11) in the memory block of FIG. 16.

Referring to FIGS. 16 and 17, a pillar PL is provided on the substrate SUB such that the pillar PL extends in a direction perpendicular to the substrate SUB to make contact with the substrate SUB. Each of the ground selection line GSL (e.g., ground selection line GSL1), the word lines WL1 to WL8, and the string selection lines SSL (e.g., string selection line SSL1) illustrated in FIG. 17 may be formed of a conductive material parallel with the substrate SUB, for example, a metallic material. The pillar PL may be in contact with the substrate SUB through the conductive materials forming the string selection lines SSL, the word lines WL1 to WL8, and the ground selection line GSL.

A sectional view taken along a line A-A' is also illustrated in FIG. 17. In an embodiment, a sectional view of a first memory cell MC1 corresponding to a first word line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may constitute a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Referring back to FIG. 14, the control circuit 460 may receive the command (signal) CMD and the address (signal) ADDR from the storage controller 300 and control an erase loop, a program loop and a read operation of the nonvolatile memory device 411 based on the command signal CMD and the address signal ADDR. The program loop may include a program operation and a program verification operation. The erase loop may include an erase operation and an erase verification operation.

For example, the control circuit 460 may generate control signals CTLs, which are used for controlling the voltage generator 470, based on the command signal CMD, and generate a row address R_ADDR and a column address C_ADDR based on the address signal ADDR. The control circuit 460 may provide the row address R_ADDR to the address decoder 450 and provide the column address C_ADDR to the data input/output circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (i.e., a selected word-line) and determine rest of the plurality of word-lines WLs except for the first word-line as unselected word-lines based on the row address R_ADDR.

The voltage generator 470 may generate word-line voltages VWLs, which are required for the operation of the nonvolatile memory device 411, based on the control signals CTLs. The voltage generator 470 may receive a power PWR from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to entire word-lines (i.e., all word-lines) of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

In addition, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In other example embodiments, one page buffer may be connected to two or more bit-lines.

The page buffer circuit 430 may temporarily store data to be programmed in a selected page or data read out from the selected page.

The data input/output circuit 440 may be coupled to the page buffer circuit 430 through data lines DLs. During the program operation, the data input/output circuit 440 may receive the data DATA from the storage controller 300 and provide the data DATA to the page buffer circuit 430 based on the column address C_ADDR received from the control circuit 460. During the read operation, the data input/output circuit 440 may provide the data DATA, which are stored in the page buffer circuit 430, to the storage controller 300 based on the column address C_ADDR received from the control circuit 460.

In addition, the page buffer circuit 430 and the data input/output circuit 440 read data from a first area of the memory cell array 420 and write the read data to a second area of the memory cell array 420. That is, the page buffer circuit 430 and the data input/output circuit 440 may perform a copy-back operation. The page buffer circuit 430 and the data input/output circuit 440 may be controlled by the control circuit 460.

Figure 18:
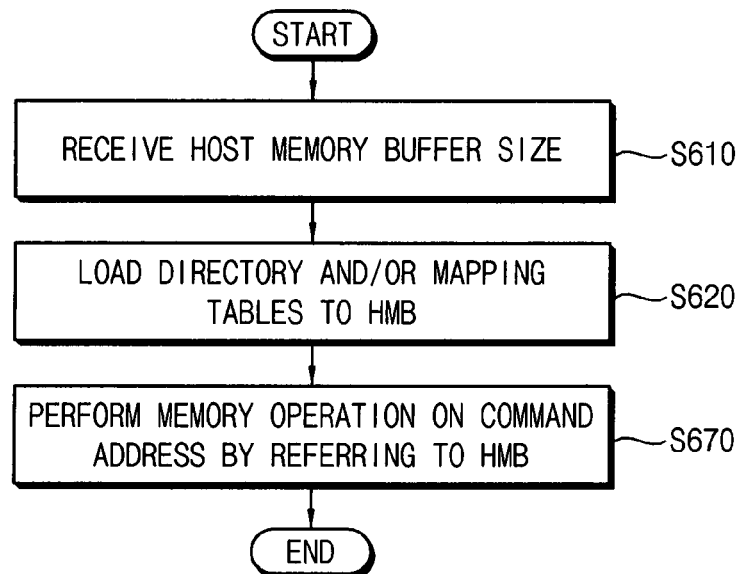
FIG. 18 illustrates a flow chart of a method of operating a storage device according to embodiments of the inventive concepts.

FIG. 18 illustrates a flow chart of a method of operating a storage device according to embodiments of the inventive concepts.

Referring to FIGS. 1 through 18, there is provided a method of operating a storage device 200 including a main storage 400 that stores data and includes a plurality of nonvolatile memory devices (i.e., nonvolatile storages), and a storage controller 300 that controls the main storage 400. In an operation S610, the storage controller 300 receives size information HMSN of a host memory buffer 133 included in a host device 100 that controls the storage device 200, from the host device 100. The host device 100 may allocate a portion of a host memory 130 as the host memory buffer 133 in response to a request from the storage controller 300 and may transmit an allocation result and the size information HMSN of the host memory buffer 133 to the storage controller 300.

In an operation S620, the storage controller 300 may load at least one of (a) at least a portion of mapping tables MTs and (b) at least one of a portion of directories DIRs to the host memory buffer 133 based on at least one of the size information HMSN and locality information LIN associated with a data access pattern of the host device 100. As described previously, the locality information LIN relates to how often data is used and/or the number of accesses to a memory address, and is thus associated with the access pattern of the host device 100, or in other words how the host device 100 accesses data in the storage device 200. The mapping tables MTs are stored in the nonvolatile memory devices and each of the mapping tables MTs indicates a mapping relationship between a physical address and a logical address of corresponding ones of the nonvolatile memory devices. The directories store address information of the mapping tables MTs.

In an operation S670, the storage controller 300 performs a memory operation designated by a command CMD on a memory location designated by an address ADDR by referring to the host memory buffer 133, based on the command CMD and the address ADDR from the host device 100.

Figure 19:
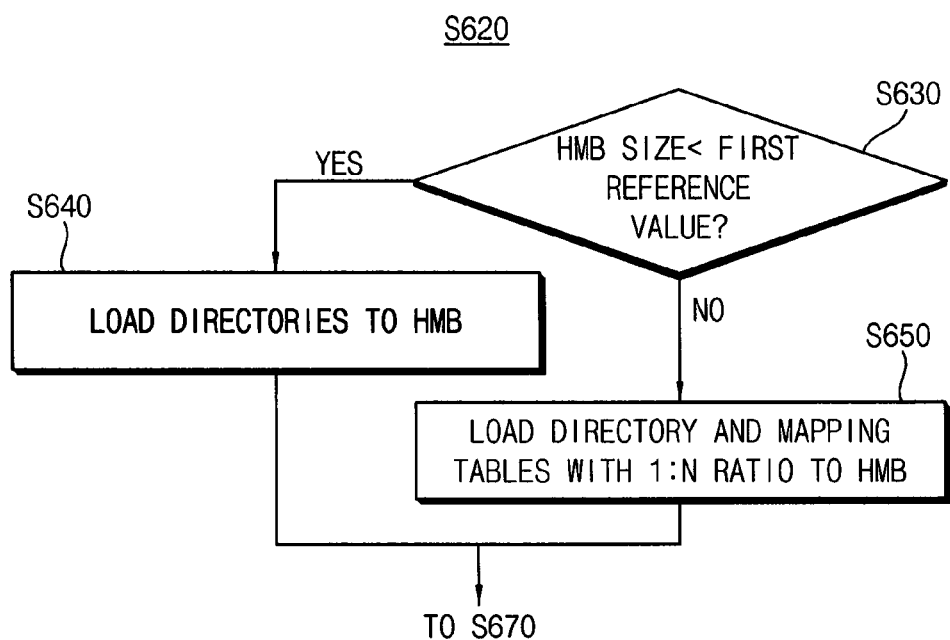
FIG. 19 illustrates a flow chart of the operation of loading directories and mapping tables in FIG. 18.

FIG. 19 illustrates a flow chart of the operation of loading directories and mapping tables in FIG. 18.

Referring to FIG. 19, the operation S620 includes operations S630, S640 and S650.

In the operation S630, a loading controller 360 of the storage controller 300 compares the size information HMSN of the host memory buffer 133 with a first reference value SREF and determines whether a size of the host memory buffer 133 is smaller than the first reference value SREF.

When the size of the host memory buffer 133 is smaller than the first reference value SREF (YES in S630), in the operation S640, the storage controller 300 loads a portion of the directories to the host memory buffer 133 preferentially based on second priority information of the directories.

When the size of the host memory buffer 133 is equal to or greater than the first reference value SREF (NO in S630), in the operation S640, the storage controller 300 loads at least one of the directories and a portion of the mapping tables to the host memory buffer 133 based on the locality information LIN, first priority information of the mapping tables and the second priority information of the directories.

Accordingly, when a size of the host memory buffer 133 is not capable of covering overall address space of mapping tables of the main storage 400 in the storage device 200, the storage controller 300 may dynamically load at least a portion of the mapping tables and a portion of the directories to the host memory buffer 133 based on at least one of the size of the host memory buffer 133 and the locality information LIN associated with data access pattern. The storage controller 300 may perform a memory operation on a memory location designated by a physical address corresponding to a logical address by referring to the host memory buffer 133. The storage controller 300 may reduce access time for accessing the mapping tables.

Figure 20:
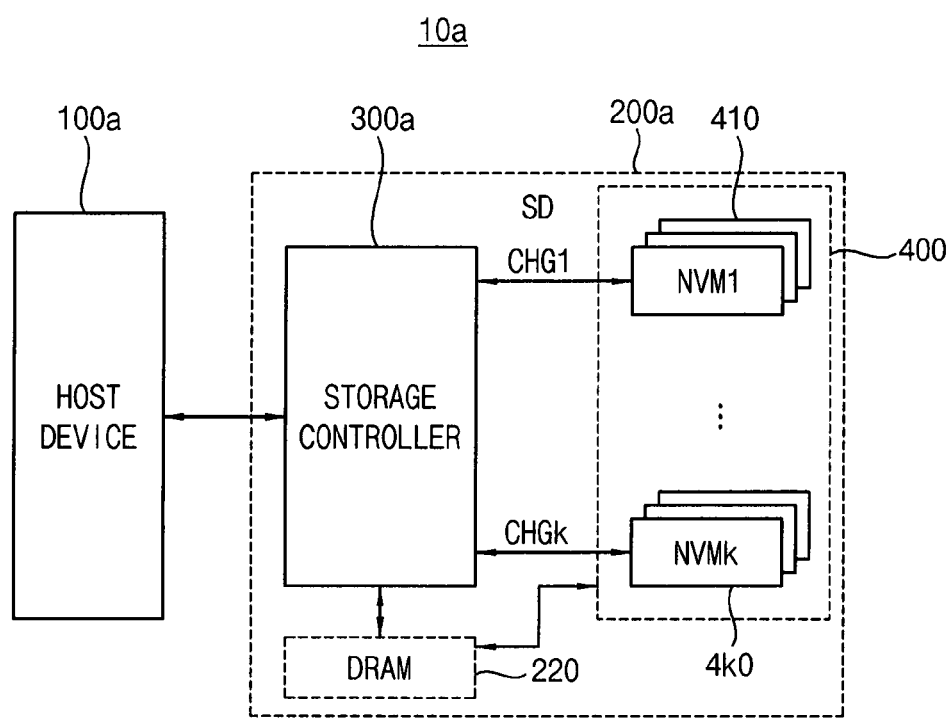
FIG. 20 illustrates a block diagram illustrating a storage system according to embodiments of the inventive concepts.

FIG. 20 illustrates a block diagram of a storage system according to embodiments of the inventive concepts.

Referring to FIG. 20, a storage system 10a includes a host device 100a and a storage device 200a.

The storage system 10a in FIG. 20 differs from the storage system 10 of FIG. 1 in that the host device 100a in FIG. 20 does not allocate a portion of the host memory as a host memory buffer, and in that the storage controller 300a in FIG. 20 performs a memory operation after the storage controller 300a loads a portion of the directories and a portion of the mapping tables to a buffer memory included in the storage controller 300a based on a size of the buffer memory and locality information. Description of structure and functionality in FIG. 20 that are the same as in FIG. 1 may be omitted from the following.

The storage device 200a includes a storage controller 300a and a main storage 400. The main storage 400 includes a plurality of nonvolatile storages 410~4k0. The storage device 200a may further include a DRAM 220. The DRAM 220 is connected to the storage controller 300a and the main storage 400 and may temporarily store meta data stored in the nonvolatile storages 410~4k0.

Figure 21:
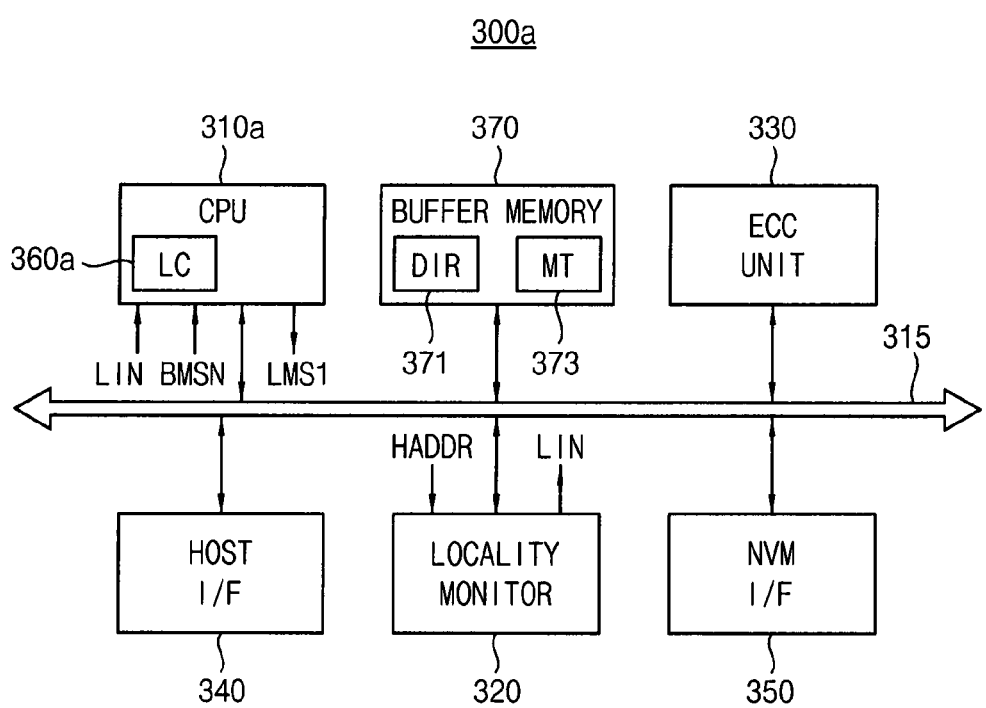
FIG. 21 illustrates a block diagram of the storage controller in FIG. 20 according to embodiments of the inventive concepts.

FIG. 21 illustrates a block diagram of the storage controller in FIG. 20 according to embodiments of the inventive concepts.

Referring to FIG. 21, the storage controller 300a includes a processor 310a such as a central processing unit (CPU), a locality monitor 320, an ECC unit 330, a host interface (I/F) 340, a buffer memory 370, a nonvolatile memory interface (I/F) 350, and a bus 315. The processor 310a may include a loading controller 360a.

In an example embodiment, the loading controller 360a may be included in the storage controller 300a as a separate component instead of being included in the processor 310a.

Configuration and operation of the storage controller 300a may be substantially similar to configuration and operation of the storage controller 300 of FIG. 4. Accordingly, structure and functionality in FIG. 21 that is the same as in FIG. 4 may be omitted from the following.

In FIG. 21, it is assumed that the buffer memory 370 has a size that is not capable of covering overall address space of mapping tables of the main storage 400 in the storage device 300a.

The locality monitor 320 may monitor locality of physical addresses based on a host address HADDR (i.e., a logical address) received from the host device 100a and may provide the loading controller 360 with locality information LIN indicating the physical address has the locality.

The loading controller 360a may control loading of the directories and the mapping tables to the buffer memory 370 based on the locality information LIN and size information BMSN associated with a size of the buffer memory 370. The loading controller 360a may generate a loading mode signal LMS1 associated with controlling the loading of the directories and the mapping tables and may provide the nonvolatile storages 400a~400k with the loading mode signal LMS1 through the nonvolatile memory interface 350. The loading controller 360a may include a register that stores reference values.

The loading controller 360a may compare the size information BMSN with a first reference value, and may generate the loading mode signal LMS1 designating preferential loading of the portion of the directories 371 to the buffer memory 370 in response to the size information BMSN being smaller than the first reference value.

The loading controller 360a may compare the size information BMSN with the first reference value, and may generate the loading mode signal LMS1 designating merged loading of the portion of the directories 371 and a portion of mapping tables 373 to the buffer memory 370 in response to the size information BMSN being equal to or greater than the first reference value.

Accordingly, when a size of a portion or overall of the buffer memory 370 is not capable of covering overall address space of mapping tables of the main storage 400 in the storage device 200a, the storage controller 300a may dynamically load at least a portion of the mapping tables and a portion of the directories to the buffer memory 370 based on at least one of the size of the buffer memory 370 and the locality information LIN associated with data access pattern. The storage controller 300a may perform a memory operation on a memory location designated by a physical address corresponding to a logical address by referring to the buffer memory 370. The storage controller 300a may reduce access time for accessing the mapping tables.

Figure 22A:
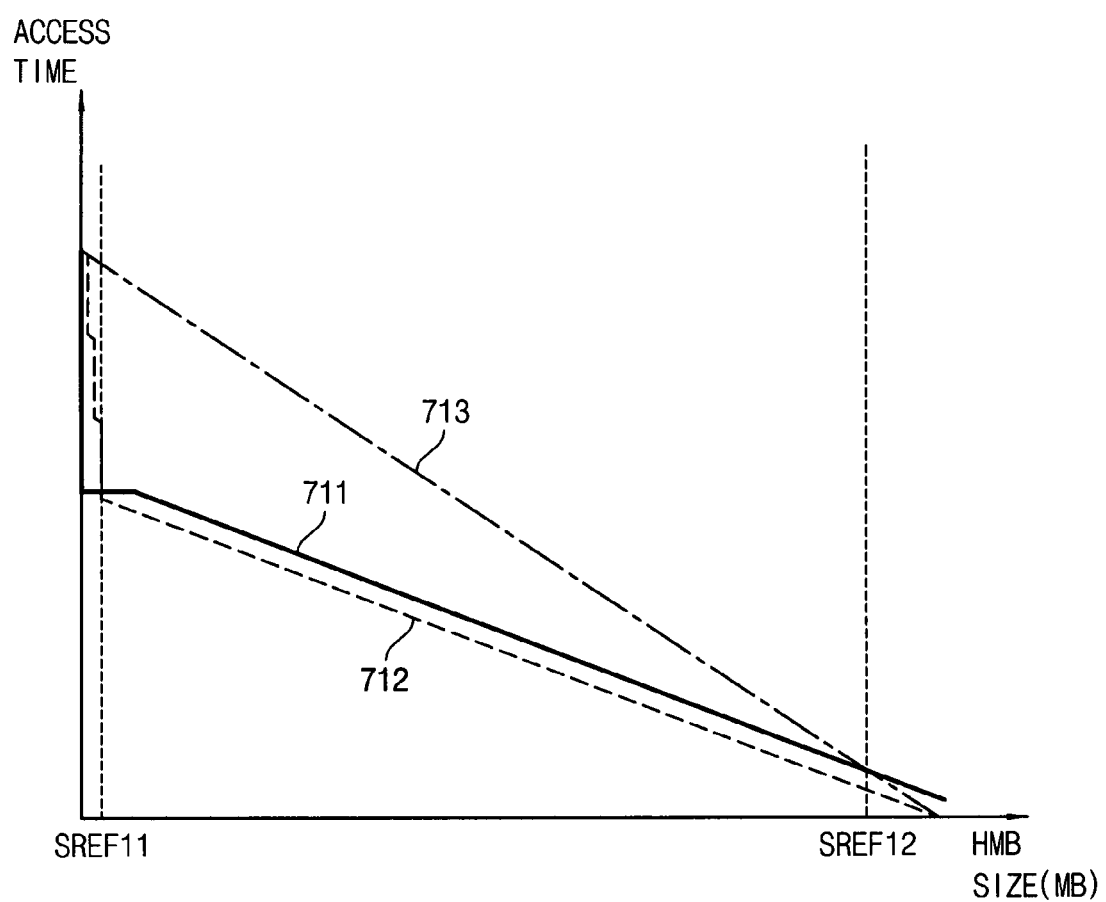
FIG. 22A illustrates a graph of access time for accessing mapping tables according to a size of the host memory buffer in the storage system in FIG. 1.

FIG. 22A illustrates a graph of access time for accessing mapping tables according to a size of the host memory buffer in the storage system in FIG. 1.

In FIG. 22A, it is assumed that N is 32.

In FIG. 22A, a reference numeral 711 (a first case) denotes access time when a portion of the directories are loaded to the host memory buffer HMB (e.g., host memory buffer 133 in host memory 130 of host device 100), a reference numeral 712 (a second case) denotes access time when the directories and the mapping tables are loaded to the host memory buffer HMB with a ratio of 1:N based on the size of the host memory buffer HMB and the locality, and a reference numeral 713 (a third case) denotes access time when a portion of the mapping tables are loaded to the host memory buffer HMB.

Referring to FIG. 22A, when a size of the host memory buffer HMB is smaller than a first reference size SREF11, access time of the first case is shorter than the second case and the third case. When the size of the host memory buffer HMB is equal to or greater than the first reference size SREF11, access time of the second case is shorter than the first case and the third case.

In addition, when the size of the host memory buffer HMB is larger than a second reference size SREF12, access time of the second and third cases is shorter than the first case.

Figure 22B:
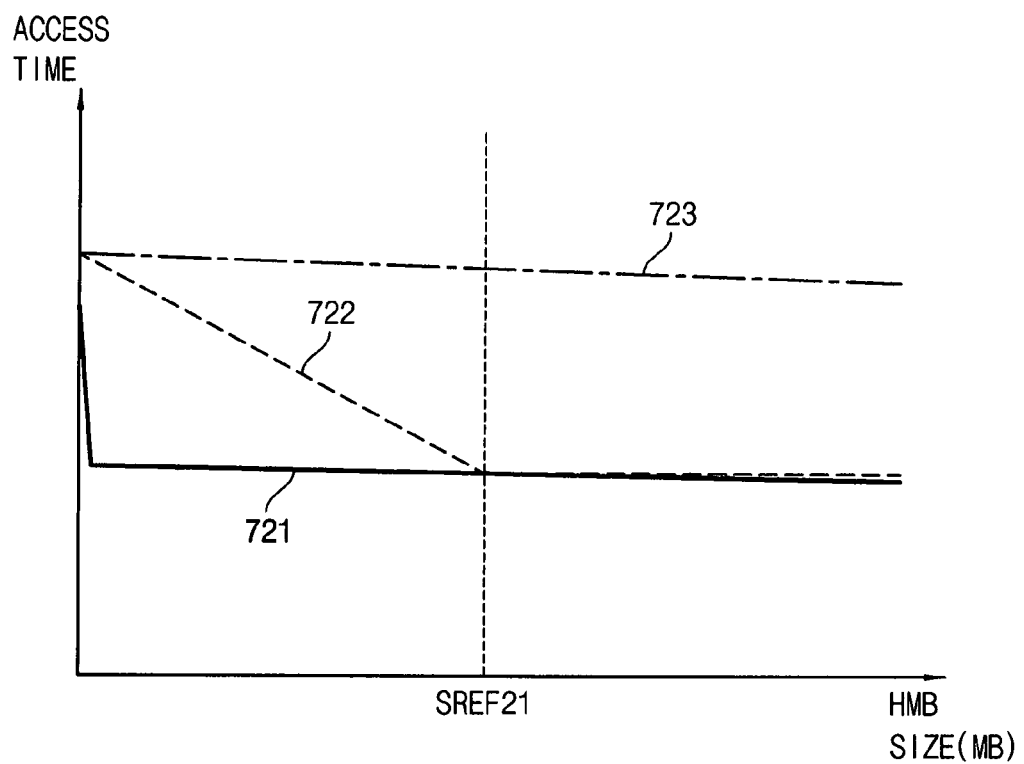
FIG. 22B illustrates a graph of access time for accessing mapping tables according to a size of the buffer memory in the storage system in FIG. 20 and the storage controller of FIG. 21.

FIG. 22B illustrates a graph of access time for accessing mapping tables according to a size of the buffer memory (e.g., buffer memory 370 in storage controller 300a of storage device 200a) in the storage system in FIG. 20 and the storage controller of FIG. 21.

In FIG. 22B, it is assumed that N is 32.

In FIG. 22B, a reference numeral 721 (a first case) denotes access time when a portion of the directories are loaded to the buffer memory 370, a reference numeral 722 (a second case) denotes access time when the directories and the mapping tables are loaded to the buffer memory 370 with a ratio of 1:N based on the size of the buffer memory 370 and the locality, and a reference numeral 723 (a third case) denotes access time when a portion of the mapping tables are loaded to the buffer memory 370.

Referring to FIG. 22B, when a size of the buffer memory 370 is smaller than a first reference size SREF21, access time of the first case is shorter than the second case and the third case.

When the size of the buffer memory 370 is equal to or greater than the first reference size SREF21, access time of the second case is substantially the same as the first case.

Figure 23:
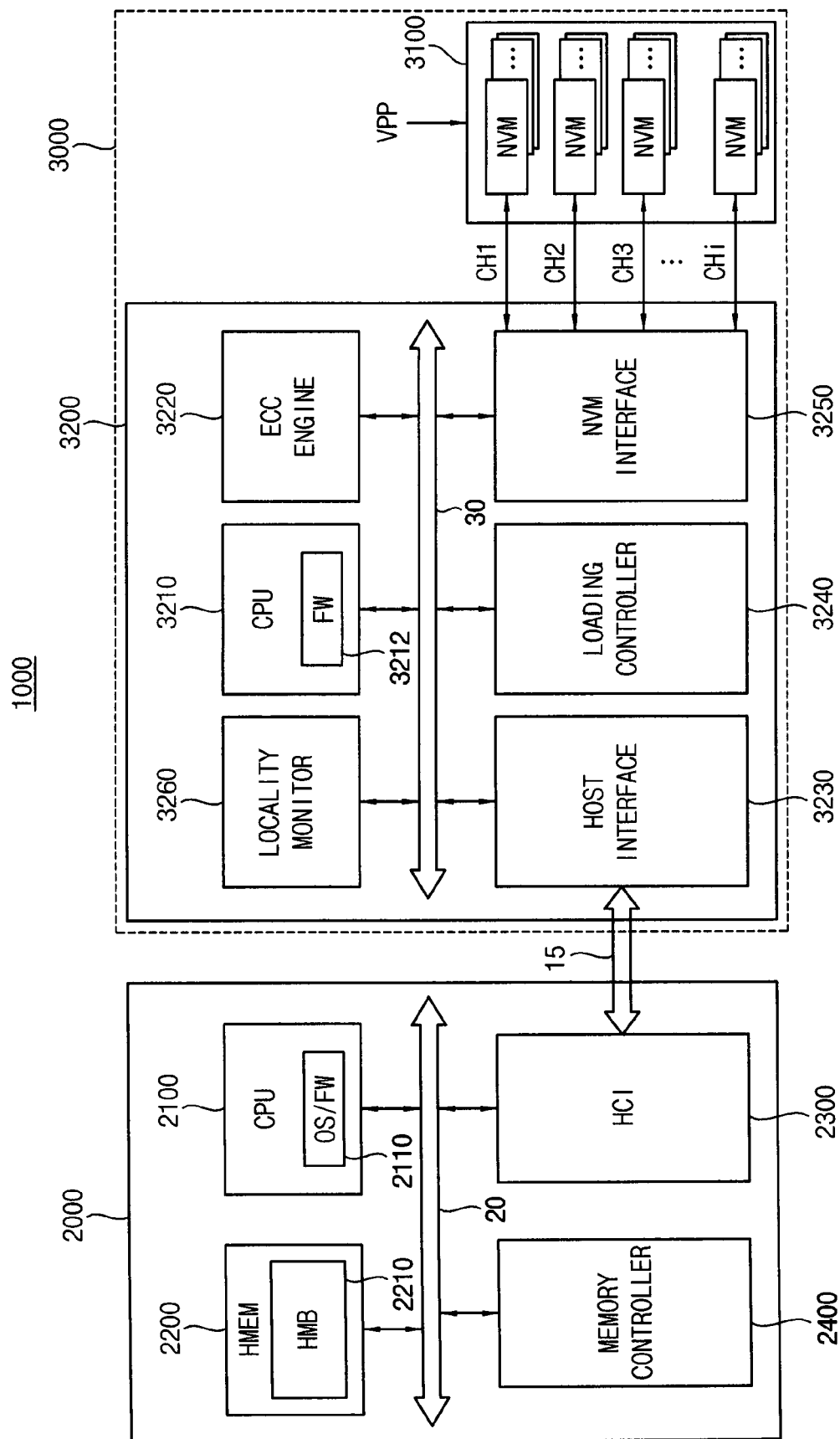
FIG. 23 illustrates a block diagram of a system including a data storage device according to embodiments of the inventive concepts.

FIG. 23 illustrates a block diagram of a system including a data storage device according to embodiments of the inventive concepts.

Referring to FIG. 23, a system 1000 includes a host device 2000 and a storage device 3000. For example, the host device 2000 may be an embedded multimedia card (eMMC), a solid state drive (SSD), or the like.

The host device 2000 may be configured to control data processing operations, such as data read operations and data write operations.

The host device 2000 may include a processor (CPU) 2100, a host memory (HMEM) 2200, a host controller interface (HCI) 2300 and a memory controller 2400 connected through a bus 20. The host memory 2200 may allocate a host memory buffer 2210 that stores a portion of directories and a portion of mapping tables. Operating system (OS) and/or host firmware (FW) 2110 may be executed by the processor 2100. The processor 2100 may execute the operation system and the host firmware 2110 to perform these operations. The memory controller 2400 may control the host memory 2200 under control of the processor 2100. The memory controller 2400 may assign a portion of the host memory 2200 as the host memory buffer 2210 that is accessible by the storage device 3000 under control of the processor 2100.

The host controller interface 2300 may interface with the storage device 3000. For example, the host controller interface 2300 is configured to issue the command CMD to the storage device 3000, receive the response RES to the command CMD from the storage device 3000, transmit write data to the storage device 3000, and receive read data from the storage device 3000.

The storage device 3000 may include multiple nonvolatile memory devices (NVM) 3100 and a storage controller 3200.

The nonvolatile memory devices 3100 may be optionally supplied with an external high voltage VPP. The storage controller 3200 may be connected to the nonvolatile memory devices 3100 through multiple channels CH1 to CHi. The storage controller 3200 may include one or more processors CPU 3210, an ECC unit 3220, a host interface 3230, a loading controller 3240, a nonvolatile memory interface 3250 and a locality monitor 3260 connected through a bus 30.

The processor 3210 is configured to control overall operations of the storage controller 3200. For example, the processor 3210 may operate firmware 3212 including a flash translation layer (FTL), and may include other firmware. The FTL may perform various functions, e.g., address mapping, read calibration, error correction, among other functions.

The locality monitor 3260 monitors a locality of data and provides locality information to the loading controller 3240 when the locality of data is monitored, as mentioned above.

The loading controller 3240, as mentioned above, dynamically loads at least a portion of the mapping tables and a portion of the directories to the host memory buffer 2210 based on at least one of the size of the host memory buffer 2210 and the locality information.

The host interface 3230 may provide an interface with external devices such as the host device 2000. The nonvolatile memory interface 3250 may provide an interface with the nonvolatile memory devices 3100. The host device 2000 and the storage device 3000 may be connected through a bus 15.

Figure 24:
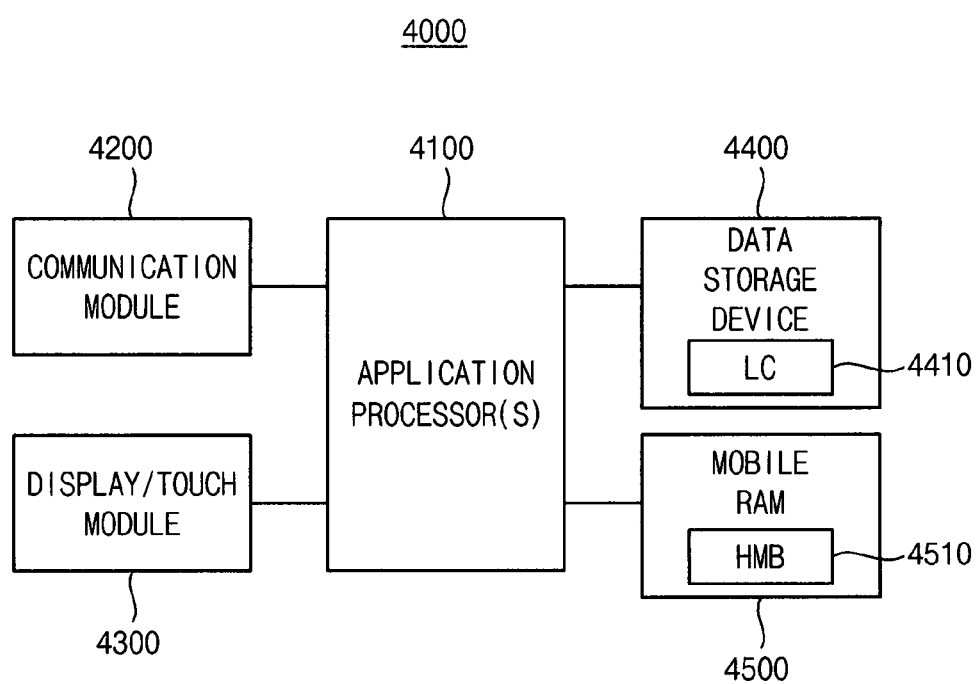
FIG. 24 illustrates a block diagram of a mobile device according to embodiments of the inventive concepts.

FIG. 24 is a block diagram illustrating a mobile device according to example embodiments.

Referring to FIG. 24, a mobile device 4000 may include an application processor 4100 (including one or more application processors), a communication module 4200, a display/touch module 4300, a data storage device 4400, and a mobile RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel (not shown). The data storage device 4400 is implemented to store user data.

The data storage device 4400 may be for example an embedded multimedia card (eMMC), a solid state drive (SSD), a universal flash storage (UFS) device, or the like. The data storage device 4400 may include a loading controller 4410 that dynamically loads at least a portion of mapping tables and a portion of directories to a host memory buffer 4510 in the mobile RAM 4500 as described above.

The mobile RAM 4500 temporarily stores data used for processing operations of the mobile device 4000. For example, the mobile RAM 4500 may be for example double data rate (DDR) synchronous DRAM (SDRAM), low power DDR (LPDDR) SDRAM, graphics DDR (GDDR) SDRAM, Rambus DRAM (RDRAM®), or the like.

As mentioned above, the storage controller may dynamically load at least a portion of the mapping tables and a portion of the directories to the a host memory buffer based on at least one of the size of the host memory buffer and the locality information associated with data access pattern, and may reduce access time for accessing the mapping tables.

The present disclosure may be applied to various electronic devices including a storage device. For example, the present disclosure may be applied to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concepts. Accordingly, all such modifications are intended to be included within the scope of the inventive concepts as defined in the claims.

What is claimed is:

1. A storage device comprising:
a main storage configured to store data, the main storage including a plurality of nonvolatile memory devices; and
a storage controller configured to control the main storage,
wherein the storage controller is configured to load to a host memory buffer included in an external host device at least one of a portion of directories in a first loading mode, and at least a portion of mapping tables and the at least one of the portion of the directories in a second loading mode, based on at least one of a size of the host memory buffer and locality information associated with a data access pattern of the external host device,
wherein the mapping tables are stored in the nonvolatile memory devices, and the mapping tables indicate a mapping relationship between a physical address and a logical address of corresponding ones of the nonvolatile memory devices, and
wherein the directories are configured to store address information of the mapping tables stored in the nonvolatile memory devices.

2. The storage device of claim 1, wherein the mapping tables are configured to store first priority information indicating access importance degree of the mapping tables, and
the directories are configured to store second priority information indicating access importance degree of the directories.

3. The storage device of claim 2, wherein the storage controller is configured to load the at least one of the portion of the directories to the host memory buffer preferentially based on the second priority information in the first loading mode, in response to determination that the size of the host memory buffer is smaller than a reference value.

4. The storage device of claim 2, wherein the storage controller is configured to load both the at least one of the portion of the directories and the at least the portion of the mapping tables to the host memory buffer based on the first priority information, the second priority information and the locality information in the second loading mode, in response to determination that the size of the host memory buffer is equal to or greater than a reference value.

5. The storage device of claim 4, wherein the at least one of the portion of the directories and the at least the portion of the mapping tables are associated with different nonvolatile memory devices of the plurality of nonvolatile memory devices.

6. The storage device of claim 4, wherein the storage controller is configured to load the at least one of the portion of the directories and the at least the portion of the mapping tables to the host memory buffer with a ratio of 1:N in the second loading mode, wherein N is a natural number greater than two.

7. The storage device of claim 6, wherein the storage controller is configured to determine a value of N based on the size of the host memory buffer.

8. The storage device of claim 1, wherein the storage controller is configured to
determine a loading ratio of the directories and the mapping tables based on the size of the host memory buffer and the locality information; and
load the at least one of the portion of the directories and the at least the portion of the mapping tables to the host memory buffer according to the determined loading ratio in the second loading mode.

9. The storage device of claim 8, wherein
the mapping tables are configured to store first priority information indicating access importance degree of the mapping tables;
the directories are configured to store second priority information indicating access importance degree of the directories; and
the storage controller is configured to select the at least one of the portion of the directories and the at least the portion of the mapping tables to be loaded to the host memory buffer based on the first priority information and the second priority information in the second loading mode.

10. The storage device of claim 1, wherein the storage controller comprises:

a locality monitor configured to generate the locality information by monitoring a host access address indicating access of the external host device to the main storage; and a loading controller configured to control loading of the directories and the mapping tables to the host memory buffer based on the locality information and size information associated with the size of the host memory buffer.

11. The storage device of claim 10, wherein the loading controller comprises:

a first comparator configured to compare the size information with a first reference value to output a first comparison signal;

a counter configured to output a counting value by counting a number of misses indicative that the logical address received from the external host device does not match one of entries in the host memory buffer;

a second comparator configured to compare the counting value with a second reference value to output a second comparison signal;

a loading mode signal generator configured to generate a loading mode signal designating one of the first and second a plurality of loading modes, based on the first comparison signal, the second comparison signal and the locality information; and a register configured to store the first reference value and the second reference value.

12. The storage device of claim 11, wherein the loading mode signal generator is configured to generate the loading mode signal designating the first loading mode including preferential loading of the at least one of the portion of the directories in response to the first comparison signal indicating that the size information is smaller than the first reference value.

13. The storage device of claim 11, wherein the loading mode signal generator is configured to generate the loading mode signal designating the second loading mode including merged loading of the at least one of the portion of the directories and the at least the portion of the mapping tables in response to the first comparison signal indicating that the size information is equal to or greater than the first reference value.

14. The storage device of claim 1, wherein the storage controller is configured to perform the first and second loading modes during a booting sequence of the storage device.

15. The storage device of claim 14, wherein the storage controller, after a completion of the booting sequence, is configured to receive a command and an address from the external host device;

search a physical address designated by the address by referring to the host memory buffer; and perform a memory operation designated by the command in a memory region designated by the physical address.

16. A method of operating a storage device including a main storage that stores data and a storage controller that controls the main storage, the main storage including a plurality of nonvolatile memory devices, the method comprising:

receiving, by the storage controller from an external host device, a size information of a host memory buffer included in the external host device that controls the storage device;

loading, by the storage controller to the host memory buffer, at least one of (a portion of directories in a first loading mode, and at least a portion of mapping tables and the at least one of the portion of the directories in a second loading mode, based on at least one of a size of the host memory buffer and locality information associated with a data access pattern of the external host device, wherein the mapping tables are stored in the nonvolatile memory devices and the mapping tables indicate a mapping relationship between a physical address and a logical address of corresponding ones of the nonvolatile memory devices, and wherein the directories are configured to store address information of the mapping tables; and performing, by the storage controller, a memory operation, designated by a command, on a memory region of the nonvolatile memory devices designated by an address, by referring to the host memory buffer based on the command and the address received from the host device.

17. A storage device comprising:

a main storage including nonvolatile memory devices that store directories and mapping tables, wherein the mapping tables indicate a mapping relationship between a physical address and a logical address of corresponding ones of the nonvolatile memory devices, and the directories store address information of the mapping tables stored in the nonvolatile memory devices; and a storage controller configured to control the main storage and selectively load the directories and the mapping tables from the nonvolatile memory devices to a host memory buffer of an external host device in a plurality of modes based on a size of the host memory buffer and a counted value of a number of misses indicative that a logical address received from the external host device does not match one of entries in the host memory buffer, wherein the plurality of modes include a first mode that comprises preferential loading of the directories from the nonvolatile memory devices to the host memory buffer, a second mode that comprises merged loading of the directories and the mapping tables from the nonvolatile memory devices to the host memory buffer, and a third mode that comprises updating the directories and the mapping tables loaded from the nonvolatile memory devices to the host memory buffer.

18. The storage device of claim 17, wherein the storage controller is configured to select the first mode when the size of the host memory buffer is smaller than a size reference value.

19. The storage device of claim 17, wherein the storage controller is configured to select the third mode when the counted value is equal to or greater than a miss reference value.

20. The storage device of claim 17, wherein during the second mode the storage controller is configured to load at least one of the directories and the mapping tables from the nonvolatile memory devices to the host memory buffer with a ratio of 1:N, wherein N is a natural number greater than two.

* * * * *